(12) United States Patent
Vepa et al.

(10) Patent No.: US 12,333,473 B2
(45) Date of Patent: Jun. 17, 2025

(54) AUTOMATIC EVALUATION OF RECORDED INTERACTIONS

(71) Applicant: Observe.AI, Inc., Redwood City, CA (US)

(72) Inventors: Jithendra Vepa, Bangalore (IN); Jason Turpin, San Francisco, CA (US); Ayush Kumar, Ranchi (IN); Amrit Dhaliwal, San Francisco, CA (US); Akshay Kalyani Kore, Bangalore (IN)

(73) Assignee: Observe.AI, Inc., Redwood City, CA (US)

( * ) Notice: Subject to any disclaimer, the term of this patent is extended or adjusted under 35 U.S.C. 154(b) by 0 days.

(21) Appl. No.: 18/364,393

(22) Filed: Aug. 2, 2023

(65) Prior Publication Data

US 2025/0045527 A1    Feb. 6, 2025

Related U.S. Application Data

(63) Continuation of application No. 17/737,824, filed on May 5, 2022, now Pat. No. 11,763,242.
(Continued)

(51) Int. Cl.
G06Q 10/0639 (2023.01)
G06F 9/451 (2018.01)
G06F 40/284 (2020.01)
G06F 40/295 (2020.01)
G10L 17/22 (2013.01)

(52) U.S. Cl.
CPC ....... G06Q 10/06398 (2013.01); G06F 9/451 (2018.02); G06F 40/284 (2020.01); G06F 40/295 (2020.01); G10L 17/22 (2013.01)

(58) Field of Classification Search
CPC ........ G06F 40/35; G06F 9/451; G06F 40/284; G10L 15/26; G10L 17/22
See application file for complete search history.

(56) References Cited

U.S. PATENT DOCUMENTS 7,908,211 B1 * 3/2011 Chen ................. G06Q 30/0601
  709/227
11,240,370 B1 * 2/2022 Liu ..................... H04L 65/1083
(Continued)

FOREIGN PATENT DOCUMENTS

| CN | 108231065 | 6/2018 |
| JP | 2004517518 | 6/2004 |
| WO | 02008933 | 1/2002 |

OTHER PUBLICATIONS

Snyder et al., "Deep Neural Network-Based Speaker Embeddings for End-to-End Speaker Verification", Center for Language and Speech Processing & Human Language Technology Center of Excellence, The Johns Hopkins University, Baltimore, MD 21218, USA. IEEE 2016. (Year: 2016).*

(Continued)

*Primary Examiner* — Pan G Choy
(74) *Attorney, Agent, or Firm* — Van Pelt, Yi & James LLP

(57) ABSTRACT

Automatic evaluation of recorded interactions is disclosed, including: detecting a plurality of signals in an interaction; combining at least a subset of the plurality of signals using a prescribed set of operators into a combined signal; and determining whether an event criterion has been met with respect to the interaction based at least in part on the combined signal.

19 Claims, 15 Drawing Sheets

Related U.S. Application Data

(60) Provisional application No. 63/287,845, filed on Dec. 9, 2021.

(56) References Cited

U.S. PATENT DOCUMENTS

| | | | | |
|---|---|---|---|---|
| 2008/0037709 | A1* | 2/2008 | Yatsenko | G21K 1/10 378/145 |
| 2011/0206198 | A1* | 8/2011 | Freedman | G06Q 30/06 379/265.03 |
| 2014/0314216 | A1* | 10/2014 | Penberthy | H04M 3/56 379/88.02 |
| 2017/0236063 | A1* | 8/2017 | Dorris | G06Q 10/10 706/11 |
| 2017/0272571 | A1* | 9/2017 | Spiessbach | H04M 3/5175 |
| 2020/0019561 | A1* | 1/2020 | Doyle | G06F 16/287 |
| 2020/0175962 | A1* | 6/2020 | Thomson | G06N 20/00 |
| 2020/0387574 | A1* | 12/2020 | Min | G06F 40/284 |

OTHER PUBLICATIONS

Brown et al., "Statistical Analysis of a Telephone Call Center", University of Pennsylvania, Scholarly Commons, Wharton Faculty Research. Journal of the American Statistical Association, 100 (469), p. 36-50, 2005. (Year: 2005).

Georg Heigold, "End-to-End Text-Dependent Speaker Verification", Saarland University & DFKI, Germany; Ignacio Moreno, Sarny Bengio, Noam Shazeer, Google Inc., USA, IEEE Xplore, ICASSP 2016. (Year: 2016).

Guruju et al., "Addressing Compliance in Call Centers with Entity Extraction}}." Proc. Interspeech 2021 (2021): 2347-2348.

Huang-Cheng Kuo, "A Rule-based cooperative transaction model and event processing in real-time active database systems", Department of Computer Engineering and Science, Case Western Reserve University, May 1997. (Year: 1997).

Sukru Ozan, Ph.D., "Classification of Audio Segments in Call Center Recordings using Convolutional Recurrent Neural Networks", arXiv:2106.02422v1 [eess.AS] Jun. 4, 2021. (Year: 2021).

Sundararaman et al. "Phoneme-BERT: Joint Language Modelling of Phoneme Sequence and ASR Transcript" Interspeech 2021, Aug. 30-Sep. 3, 2021.

Snyder et al., "Deep Neural Network-based Speaker Embeddings for End-to-End Speaker Verification", Center for Language and Speech Processing & Human Language Technology Center of Excellence, The Johns University, Baltimore, MD 21218, USA. IEEE Xplore, SLT 2016. (Year: 2016).

* cited by examiner

Agent: Mam *May I Know* you *ate of Birth* and *Last for Digits of s s n* — 1002

*Question: Yes -- Entity Type*

Customer: Right One Sec it is Twentieth March Ninety Five

Agent: Alright so I'm Pulling up Your Account Hold on

Customer: *How Long will it Take* I'm Already Sick of Calling You Guys Thrice to Date — 1004

*Question: Yes -- Descriptive + Entity Type*

Agent: Just a Min Mam so What I See What I Notice is that Your Loan Application has not Reached yes I Mean to Say that is in Our Records I Need to Check Why Who as in *What is Causing the Delay* I'm Really Sorry for that — 1006

*Question: Not a Question*

Customer: This is so Unexpected *When Can I Get a Closure* to Process My Loan — 1008

*Question: Yes -- Descriptive + Entity Type*

FIG. 10

Event: Did the agent verify Name, Date of Birth, and Social Security Number/Address of the Customer

Detect machine learning (ML) and keyword spotting (KWS) signals

S1: (ML) Person Name Entity Identifier in the Agent's text

S2: (KWS) Phrases hinting at "Agent introduction" in the Agent's text

S3: (ML) Person Name Entity Identifier in the Customer's text

S4: (KWS) Phrases hinting at *Customer Name verification* in the Agent's text

S5: (ML) Entity Question Identifier in the Agent's text

S6: (KWS) Phrases hinting at "Date of Birth verification" in the Customer's text S7: (KWS) Phrases hinting at "Social Security Number/Address verification" in the Customer's text

Generate a combined signal based using operators

{S1 AND {NOT{S2} OR S4 }} OR S3} AND {S5 DIALOG_AND S6} AND {S5 DIALOG_AND S7}

Compare the combined signal to criteria associated an Event

FIG. 12

FIG. 14A ance of a specific component-->
AUTOMATIC EVALUATION OF RECORDED INTERACTIONS

CROSS REFERENCE TO OTHER APPLICATIONS

This application is a continuation of U.S. patent application Ser. No. 17/737,824, entitled AUTOMATIC EVALUATION OF RECORDED INTERACTIONS filed May 5, 2022 which is incorporated herein by reference for all purposes, which claims priority to U.S. Provisional Patent Application No. 63/287,845 entitled AUTOMATIC QUALITY ASSURANCE OF RECORDED SERVICE CALLS filed Dec. 9, 2021 which is incorporated herein by reference for all purposes.

BACKGROUND OF THE INVENTION

One of the important processes to be performed with respect to a call center is performing quality assurance of call center agents' performances. Quality assurance of an agent's performance is typically performed using evaluation forms and a set of questions with categorical answers (e.g., yes, no, not available). However, the conventional form of quality assurance on an agent's performance is manual and laborious. In some instances, reviewing a single recorded call to manually identify the presence of certain keywords can be very time-consuming and the reviewer also needs to complete the evaluation forms and respond to provided questions. Furthermore, manual reviews of agents' performances are subjective and not consistent from reviewer to reviewer.

BRIEF DESCRIPTION OF THE DRAWINGS

Various embodiments of the invention are disclosed in the following detailed description and the accompanying drawings.

FIG. 10 is a diagram showing an example of detecting entity question type signals from a dialog comprising two text streams corresponding to two different speakers in a recorded interaction.

FIG. 12 is a diagram that shows examples of some signals that are detected from a recorded interaction and also a combined signal that is determined by combining those signals together.

FIGS. 14A and 14B are diagrams showing a single example user interface for presenting combined signals and recommended event evaluation results corresponding to a processed recorded interaction.

DETAILED DESCRIPTION

Figure 1:
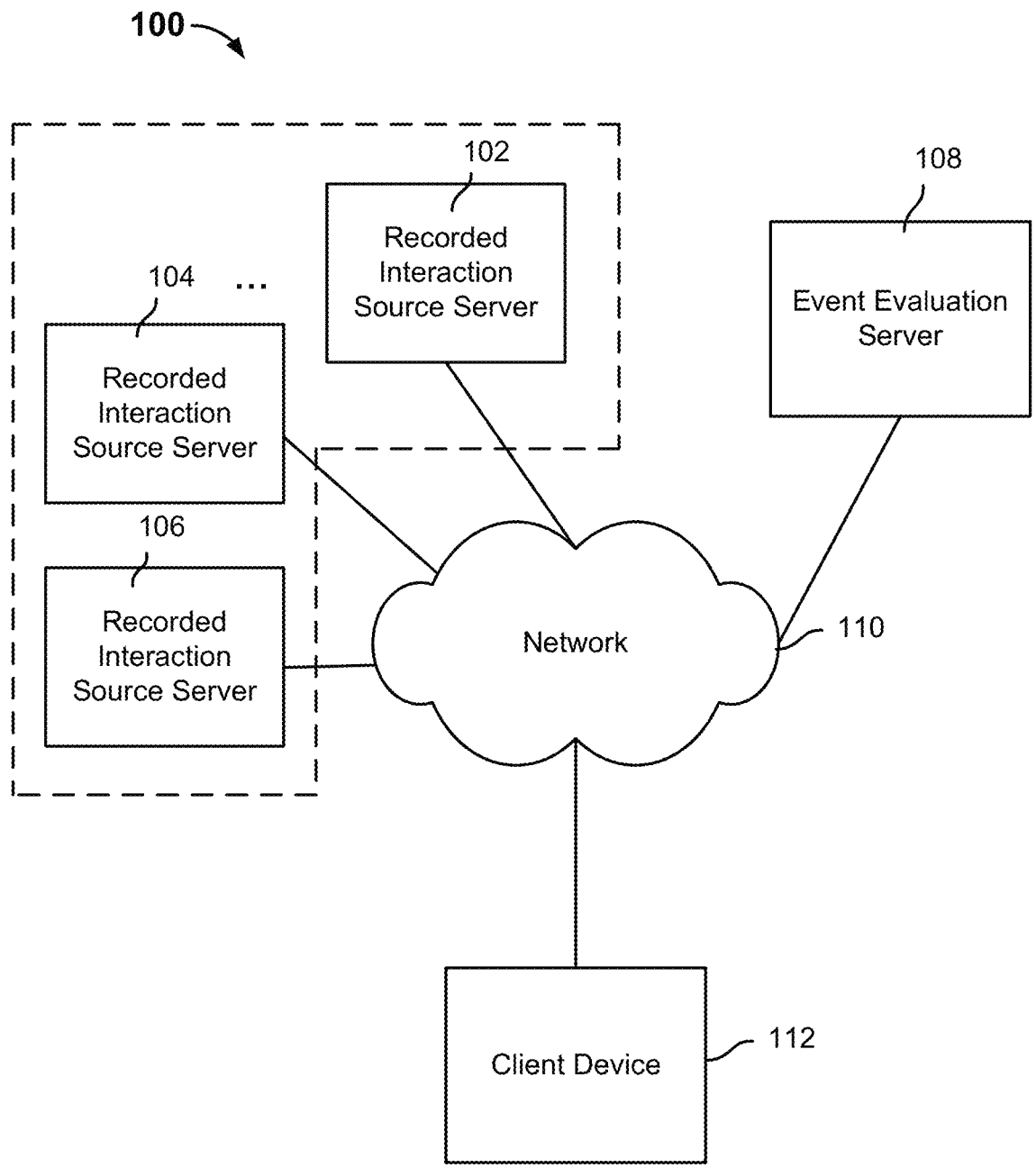
FIG. 1 is a diagram showing an embodiment of a system for performing automatic quality assurance of recorded interactions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of automatic quality assurance of recorded interactions are described herein. A plurality of signals is detected in an interaction. In various embodiments, an "interaction" comprises a recorded text-based chat log, a recorded audio conversation (e.g., of a phone call), or a recorded video. In various embodiments, an interaction comprises two or more participants (e.g., speakers). In some embodiments, signals can be detected from the text (e.g., transcription) and/or audio portion of the interaction. For example, each signal can indicate the (e.g., likely) presence of a key phrase, sentiment, and/or a type of dialogue across the text/audio of one or more participants. At least a subset of the plurality of signals are combined using a prescribed set of operators into a combined signal (which is sometimes referred to as an "advance moment"). In some embodiments, a group of two or more of the detected signals are combined using operators that are dictated in a set of interaction processing configuration information. For example, the operators comprise AND, OR, NEAR, DIALOG_AND, LEFT, and RIGHT. It is determined whether an event criterion has been met with respect to the interaction based at least in part on the combined signal. For example, the event criterion comprises a condition against which to compare the combined signal to determine whether an event had occurred in the interaction. As will be described in further detail below, by combining a group of individual signals into combined signals based on prescribed operators, complex relationships between the signals can be inferred and then used to determine whether certain events happened in the interaction. For example, whether certain events happened in the interaction can facilitate the quality assurance process of the performance of a particular participant (e.g., a customer service agent) within the interaction.

FIG. 1 is a diagram showing an embodiment of a system for performing automatic quality assurance of recorded interactions. As shown in FIG. 1, system 100 includes recorded interaction source server 102, recorded interaction source server 104, recorded interaction source server 106, event evaluation server 108, network 110, and client device 112. Each of recorded interaction source server 102, recorded interaction source server 104, recorded interaction source server 106, event evaluation server 108, and client device 112 can communicate to each other over network 110.

Each of recorded interaction source server 102, recorded interaction source server 104, and recorded interaction source server 106 is configured to record interactions and/or obtain recorded interactions. In various embodiments, a "recorded interaction" comprises a recorded text-based, audio-based, and/or video-based exchange between two or more participants. Examples of a recorded interaction include a recorded phone call between two or more participants, a recorded history/log of a chat message conversation between two or more participants, a recorded video conversation between two or more participants, etc. In a specific example, where a recorded interaction source server comprises a server located in a call center, the participants in a recorded interaction include a customer service agent and a customer and where the agent is assisting the customer in resolving an issue. While three recorded interaction source servers (e.g., 102, 104, and 106) are shown in the example of FIG. 1, in other examples, fewer or more recorded interaction source servers may be used to record interactions and/or obtain recorded interactions.

Client device 112 is configured to access a user interface that is provided by event evaluation server 108 and where the user interface is configured to enable a user to submit and/or configure a set of interaction processing configuration information corresponding to a specified objective. In various embodiments, a set of interaction processing configuration information can describe one or more of the following: which signals to detect from an interaction (e.g., each signal can be associated with one or more roles of participants in the interaction), which detected signals to group together, which operators should be used to combine each group of detected signals, and event criteria to compare against the combined signals. As will be described in further detail below, a set of interaction processing configuration information allows a user to customize which signals are to be detected from the audio, video, and/or text portions of a recorded interaction, how to combine certain signals based on prescribed operators, and use the combined signals to determine the likelihood that certain events had occurred within the interaction. For example, an event is that a certain piece of information (which is sometimes referred to as an "entity") was queried or provided by a particular participant within the interaction. Returning to the specific example in which the participants in the recorded interaction include a customer service agent and a customer, the specified objective associated with a corresponding set of interaction processing configuration information could be for quality assurance of agent performance and the occurrence of events in the interaction can be whether the agent had asked certain entity questions and/or whether the customer had provided appropriate answers to those questions.

Event evaluation server 108 is configured to obtain sets of interaction processing configuration information from client devices such as client device 112 and store them. In some embodiments, each set of interaction processing configuration information is stored with its specified objective. As will be described below, for each recorded interaction that event evaluation server 108 obtains, event evaluation server 108 will retrieve the set of interaction processing configuration information whose specified objective matches an attribute (e.g., interaction source, interaction type) of the recorded interaction to use to programmatically evaluate the likelihood that certain events that are dictated in the configuration information have occurred within the interaction.

Event evaluation server 108 is configured to obtain interactions recorded from one or more of recorded interaction source servers 102, 104, and 106. In various embodiments, event evaluation server 108 is configured to obtain recorded interactions of one or more types (e.g., recorded text-based, audio-based, and/or video-based exchanges between two or more participants) from recorded interaction source servers 102, 104, and 106. If an interaction (e.g., a chat log) comprises text, in some embodiments, event evaluation server 108 is configured to generate two or more text streams from the interaction (e.g., based on metadata, annotation in the text), where each text stream corresponds to text provided by a different participant. In various embodiments, the text stream or audio stream from an interaction is associated with timestamps that correspond to when certain text or speech appear within the interaction. If an interaction (e.g., a recorded phone call) comprises audio, in some embodiments, event evaluation server 108 is configured to generate two or more text streams (e.g., based on text transcription techniques) and/or two or more audio streams from the audio (e.g., based on speaker diarisation techniques), where each text/audio stream corresponds to speech provided by a different participant. If an interaction (e.g., a recorded phone call) comprises video and audio, in some embodiments, event evaluation server 108 is configured to generate two or more text streams (e.g., based on text transcription techniques) and/or two or more audio streams from the audio (e.g., based on speaker diarisation techniques), where each text/audio stream corresponds to speech provided by a different participant. In some embodiments, event evaluation server 108 is configured to determine a corresponding role associated with each participant in an interaction based on the metadata associated with the interaction and/or applying machine learning techniques to at least a portion of each text and/or audio stream to recognize corresponding participant roles. A first set of example roles of participants includes a customer service agent and a customer. A second set of example roles of participants includes an educator and a student.

Once text and/or audio stream(s) corresponding to each distinct speaker are determined for a recorded interaction, event evaluation server 108 is configured to retrieve a set of interaction processing configuration information whose specified objective matches an attribute associated with the interaction. Event evaluation server 108 is configured to use the matching set of interaction processing configuration information to detect signals from the text and/or audio streams of each distinct participant in the interaction. A signal can be detected using any appropriate technique. In a first example, a signal can be detected using keyword spotting (which is sometimes referred to as "KWS"). For example, keyword spotting can be performed on either text (e.g., text transcription of speech) or audio to determine a verbatim match using a technique such as a dynamic time warping and/or a neural network classifier. In a second example, a signal can be detected using machine learning (which is sometimes referred to as "ML"). For example, some machine learning techniques that can be used to detect signals include deep learning techniques such as attention-based learning and transformer models (e.g., BERT). As will be described in further detail below, a single signal can be derived from the text and/or audio stream(s) of one participant associated with a first role and/or the text and/or audio stream(s) of at least one other participant associated with a second role. Event evaluation server 108 is further configured to group together signals that are to be combined in accordance with the matching set of interaction processing configuration information. In some embodiments, a detected signal can be grouped and/or eventually combined into zero or more combined signals. Event evaluation server 108 is configured to combine each group of signals according to the operators (e.g., OR, AND, NEAR, DIALOG_AND, LEFT, RIGHT) prescribed by the matching set of interaction processing configuration information. In some embodiments, in addition to operators, the matching set of interaction processing configuration information can also prescribe a particular sequence to combine the grouped signals and/or to combine the different signals within a group using specified weights.

Event evaluation server 108 is configured to compare the combined signals that have been derived from an interaction against the event criteria described in the matching set of interaction processing configuration information. In a first example, the event criteria describe conditions that if met by the combined signals, indicate which events have occurred within the interaction. In a second example, event criteria describe conditions that if met by the combined signals, indicate the degree of likelihood that certain events have occurred within the interaction. In a third example, event criteria describe conditions that if met by the combined signals, indicate the qualitative assessments (e.g., satisfactory, unsatisfactory) of the performance of certain events in the interaction. In some embodiments, event evaluation server 108 is configured to present one or more of the following at a user interface: signals detected from an interaction, the combined signals generated from the detected signals, and the events described in the event criteria and the determination of whether each such event did occur (and, optionally, the likelihood that the event did occur) within the interaction. For example, the events described in the event criteria can correspond to a checklist of events and whether the events appear within the interaction is evaluated to provide quality assurance on the part of the participation/speech/text that is provided by at least one participant in the interaction. In a specific example, the events described in the event criteria correspond to a checklist of events that are desired to be performed by a customer service agent in a conversation with a customer. In the customer service example, the events may correspond to questions that the agent should have asked, exchanges that were desired to have occurred between the agent and the customer, information that should have been solicited by the agent from the customer, behavior that the agent should have exhibited (e.g., a positive tone), and/or behavior that the agent should not have engaged in (e.g., uttered a profanity). A quality assurance user that is reviewing the user interface can then quickly assess the events that occurred or did not occur within the interaction to make an overall assessment on the quality of the performance of at least one participant within the interaction including areas, if any, that the participant could improve upon or be reminded to not omit in a subsequent interaction. In some embodiments, event evaluation server 108 can generate an overall assessment of the performance of at least one participant within the interaction based on the determined events that (likely) occurred within the interaction.

As such, event evaluation server 108 is configured to programmatically evaluate recorded interactions between multiple participants for the occurrence of certain events within the interactions, without requiring manual review of the entire interaction. A recorded interaction could be long and also include information that is not relevant to the quality assurance criteria and so manual review of the entire interaction could be very labor-intensive and inefficient. Various embodiments described herein provide techniques to enable customized programmatic evaluation of whether certain events could have occurred within each recorded interaction. By leveraging a system such as system 100, interactions of different types (e.g., text-based, audio-based, and/or video-based) can be reviewed quickly for the presence of complex or nuanced events and facilitate efficient quality assurance or other types of review of recorded interactions. The programmatic evaluation of interactions that is performed by system 100 can also be conveniently incorporated into existing workflows. The programmatic evaluation of interactions that is performed by system 100 will drive consistent evaluations and eliminate human errors and biases.

Figure 2:
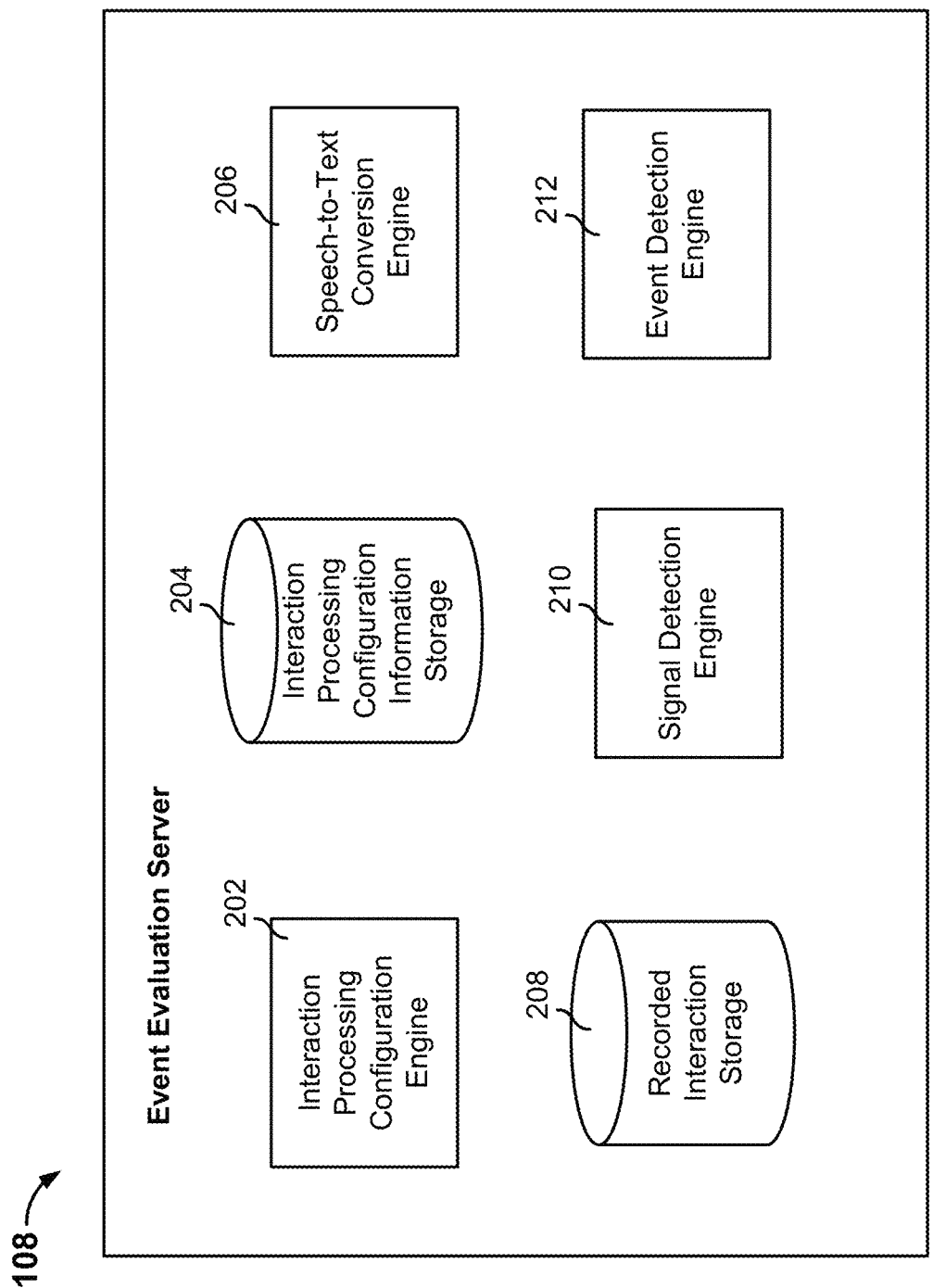
FIG. 2 is a diagram showing an example of an event evaluation server in accordance with some embodiments.

FIG. 2 is a diagram showing an example of an event evaluation server in accordance with some embodiments. In some embodiments, event evaluation server 108 of system 100 of FIG. 1 may be implemented using the example event evaluation server shown in FIG. 2. The example event evaluation server includes interaction processing configuration engine 202, interaction processing configuration information storage 204, speech-to-text conversion engine 206, recorded interaction storage 208, signal detection engine 210, and event detection engine 212. In some embodiments, each of interaction processing configuration engine 202, speech-to-text conversion engine 206, signal detection engine 210, and event detection engine 212 is configured to be implemented using a hardware processor and/or software. In some embodiments, interaction processing configuration information storage 204 and recorded interaction storage 208 is each configured to be implemented using any appropriate storage media.

Interaction processing configuration engine 202 is configured to obtain a set of interaction processing configuration information that is submitted by a user. In various embodiments, interaction processing configuration engine 202 is configured to provide a user interface (e.g., at a particular URL) that is configured to provide fields, selections, menus, and/or other elements that will enable a user to configure and submit a set of interaction processing configuration information associated with a specified objective. In some embodiments, a "specified objective" describes an attribute (e.g., an application or type of source) associated with a recorded interaction on which to apply the set of interaction processing configuration information. As mentioned above, a set of interaction processing configuration information can be configured to include one or more of the following: which signals to detect from an interaction (e.g., each signal can be associated with one or more roles of participants in the interaction), which detected signals to group together, which operators should be used to combine each group of detected signals, and event criteria to compare against the combined signals. In some embodiments, each signal to be detected can be configured by a user in a set of interaction processing configuration information to be obtained from the text and/or audio associated with a participant of a particular role in the interaction. In some embodiments, a configured signal in a set of interaction processing configuration information can match, identify, estimate, or classify the text, audio, or video of the interaction. In some embodiments, a configured signal can return a category, a binary value (e.g., true/false), a floating value, or a string. Specific examples of signals include keywords or phrases, keyword or phrase plus action, linguistic (semantic) and acoustic cues, speech rate, and the accuracy of provided information. In some embodiments, the set of interaction processing configuration information describes two or more individual signals to group together and then combine with specified operators (e.g., NEAR, OR, AND, LEFT, RIGHT, and DIALOG_AND). In some embodiments, grouped signals are combined with not only specified operators, but also in a specified sequence and/or specified weights. In some embodiments, the set of interaction processing configuration information describes event criteria to compare to the combined signals and where the event criteria specify the conditions that indicate that certain events did appear in the interaction given specified combined signals. For example, whereas individual signals that are to be combined together each indicate the presence of a different variation (e.g., the usage of different questions or phrases) of a customer service agent inquiring about the user's legal name, the combined signal can return a "true" value as long as one of the individual signals returns a "true" value. That combined signal can then be compared against a criterion associated with the event that the agent did (likely) ask the customer for the customer's legal name.

Interaction processing configuration information storage 204 is configured to store sets of interaction processing configuration information associated with various specified objectives. In some embodiments, a set of interaction processing configuration information associated with a specified objective can be updated over time (e.g., via a user interface that is provided by interaction processing configuration engine 202).

Speech-to-text conversion engine 206 is configured to transcribe the uttered speech of an audio portion of a recorded interaction into text. In some embodiments, speech-to-text conversion engine 206 is configured to first determine whether text is already associated with the recorded interaction and in the event that text is not already associated with the recorded interaction, speech-to-text conversion engine 206 is configured to transcribe the recorded speech of the audio portion (e.g., of a recorded phone call or a recorded video) into streams of text, where each stream of text is associated with a distinct speaker. In a first example, the recorded interaction may include separate channels corresponding to the audio of different speakers and so speech-to-text conversion engine 206 can transcribe the audio corresponding to each channel to obtain the text stream to a respective speaker/participant in the interaction. In a second example, the recorded interaction includes a single channel with speech from multiple speakers and so speech-to-text conversion engine 206 is configured to perform diarisation to partition the audio stream into segments according to the speaker identity. In some embodiments, speech-to-text conversion engine 206 is configured to determine a participant role for each text stream based on the metadata associated with the recorded interaction and/or based on applying machine learning to the audio or text content associated with that text stream.

Recorded interaction storage 208 is configured to store recorded interactions, their metadata, and/or information derived from the recorded interactions. For example, each recorded interaction (e.g., the recorded chat log, the recorded phone call, or the recorded video) is stored with any metadata that is obtained from the source of the recorded interaction, any text streams that are derived from the recorded audio portion of the interaction, and signals that have been derived from the recorded interaction.

Signal detection engine 210 is configured to detect signals from a recorded interaction. In various embodiments, signal detection engine 210 is configured to detect signals that are described in the set of interaction processing configuration information associated with a specified objective that matched the interaction. Examples of signals include key phrases, dialogue, intent, sentiment, speaking speed, entity question, articulation, and profanity. Each signal that is described by the set of interaction processing configuration information can describe at least the technique to use to detect the signal (e.g., machine learning, or keyword spotting); whether to detect the signal from the video, audio and/or text portion of the interaction associated with one or more participant roles; and the type of the signal (e.g., a category, a floating value, a Boolean value, or a string value). Each signal that is detected from the interaction may, for example, include a corresponding portion of the text transcription of the audio portion and/or segments (e.g., and timestamps) of the video portion of the interaction.

Signal detection engine 210 is further configured to group and combine signals detected from a recorded interaction. In various embodiments, signal detection engine 210 is configured to group signals according to a set of interaction processing configuration information associated with a specified objective that matched the interaction from which the signals were detected. As described above, a set of interaction processing configuration information describes sets of two or more signals that are to be grouped together (e.g., in a particular sequence) and then combined using prescribed operators (e.g., AND, OR, NEAR, DIALOG_AND, LEFT, RIGHT) (and optionally, weights) to result in corresponding combined signals. Each combined signal can have a type such as a category, a floating value, a Boolean value, or a string value. As such, each combined signal can represent an aggregation or a (complex) relationship among a collection of signals that were detected from an interaction.

Event detection engine 212 is configured to compare the combined signals that were derived from a recorded interaction to event criteria to determine whether certain events occurred (or were likely to have occurred) within the interaction. In various embodiments, event detection engine 212 is configured to compare the combined signals determined by signal detection engine 210 to event criteria that were described in the set of interaction processing configuration information associated with a specified objective that matched the interaction from which the combined signals were derived. As described above, a set of interaction processing configuration information describes the criteria/conditions which, if met by one or more combined signals, indicate that a certain event (e.g., likely) happened or were performed (e.g., with a corresponding degree of satisfaction) within the interaction. For example, an event is whether a participant with a first specified role (e.g., a customer service agent) had asked a particular entity question and that entity was provided by a participant with a second specified role (e.g., a customer). In some embodiments, event detection engine 212 is configured to present recommended evaluations results corresponding to the events for which the combined signals of the interaction had met at a user interface. In some embodiments, event detection engine 212 is further configured to present the corresponding text and/or audio segments of the interaction from which the signals were detected at the user interface, as well as the groupings of signals that were used to determine the combined signals.

Figure 3:
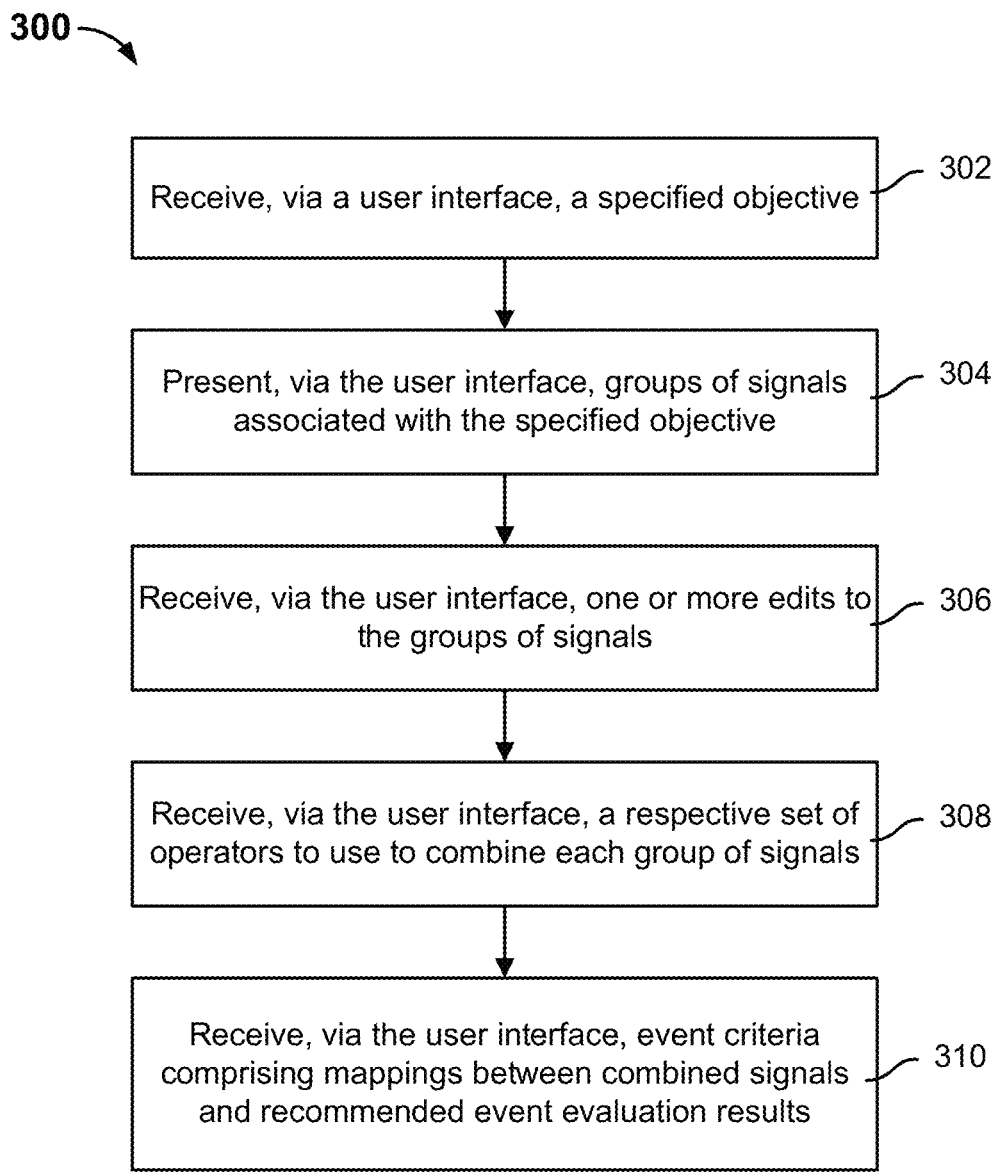
FIG. 3 is a flow diagram showing an example of a process for configuring a set of interaction processing configuration information associated with a specified objective in accordance with some embodiments.

FIG. 3 is a flow diagram showing an example of a process for configuring a set of interaction processing configuration information associated with a specified objective in accordance with some embodiments. In some embodiments, process 300 can be implemented, at least in part, on event evaluation server 108 of system 100 of FIG. 1.

At 302, a specified objective is received via a user interface. In some embodiments, the specified objective describes a goal and/or attributes associated with interactions that can be processed using the set of interaction processing configuration information. One example of a specified objective is performing quality assurance on a recorded customer service phone call and so the set of interaction processing configuration information can be applied to recorded interactions that are obtained from a call center.

At 304, groups of signals associated with the specified objective are presented via the user interface. In some embodiments, suggested signals are presented to be selected at the user interface. In some embodiments, suggested groupings of such signals are also presented at the user interface and where each grouping of signals is associated with a particular topic or category. For example, the signals and/or groupings thereof can be programmatically suggested based on the specified objective.

At 306, one or more edits of the groups of signals are received via the user interface. Which signals should be grouped together and ultimately combined to form a combined signal (an "advance moment") can be edited at the user interface. For example, editing a group of signals may include adding a new signal to the group and/or removing a signal from the group. For example, the new signal can be a custom-created signal with a customized detection technique, a specified role associated with the audio or text from which the signal is to be detected, and/or a type of the signal.

At 308, a respective set of operators to use to combine each group of signals is received. Examples of operators include one or more of the following: OR, AND, NEAR, DIALOG_AND, LEFT, and RIGHT. In some embodiments, in addition to the operators, a sequence and/or weights to use to combine each group of signals are also received via the user interface.

At 310, event criteria comprising mappings between combined signals and recommended event evaluation results are received via the user interface. The event criteria comprising conditions that if met by one or more specified combined signals indicate a corresponding recommended event evaluation result are received at the user interface. For example, the recommended event evaluation result associated with an event indicates that the event (likely) happened within the interaction and/or the event was performed with an associated degree of satisfaction within the interaction. As such, the inputs received via process 300 can be used to customize a corresponding set of interaction processing configuration information.

Figure 4:
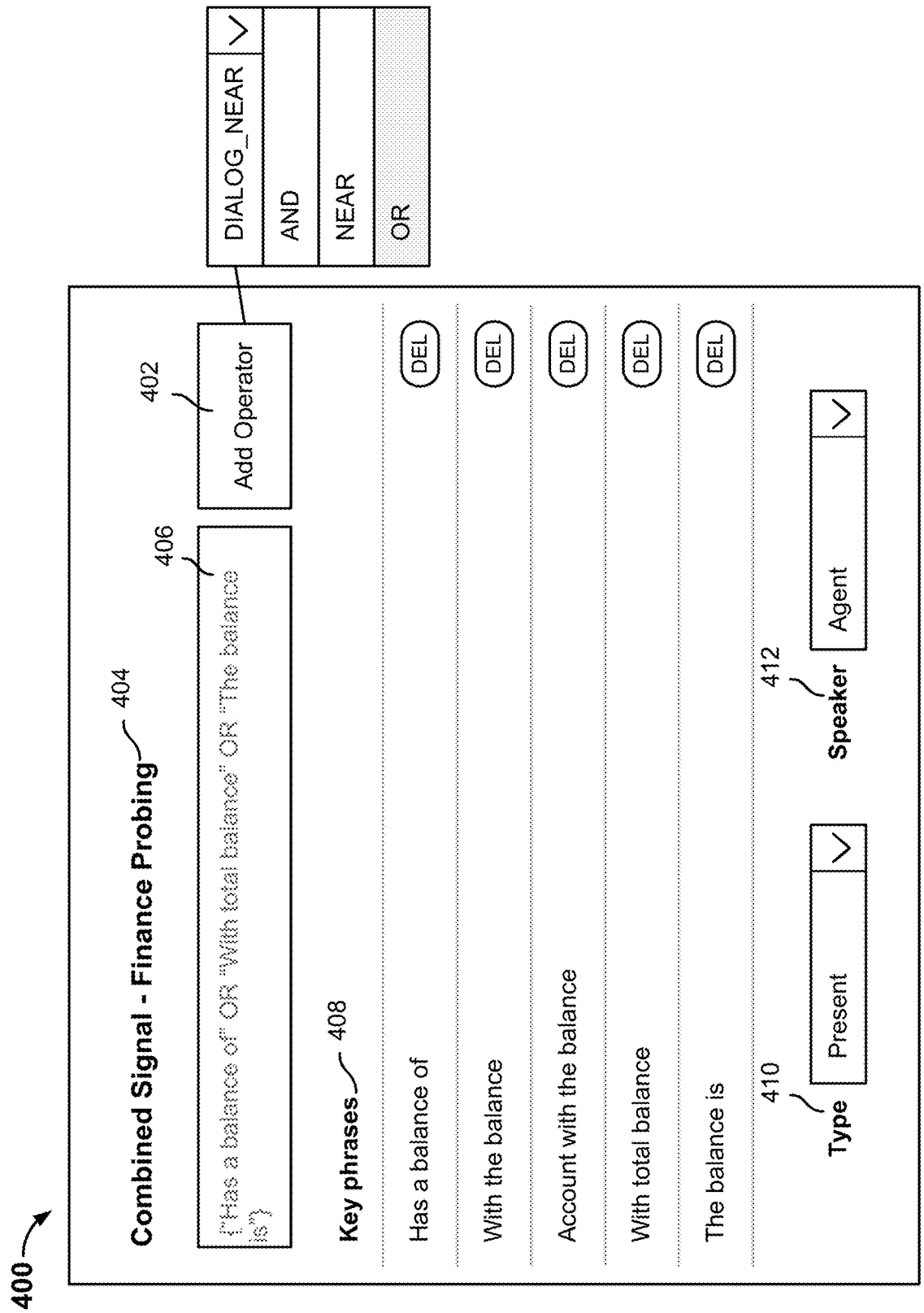
FIG. 4 is a diagram showing an example user interface for configuring a portion of a set of interaction recording processing configuration information in accordance with some embodiments.

FIG. 4 is a diagram showing an example user interface for configuring a portion of a set of interaction recording processing configuration information in accordance with some embodiments. User interface 400 provides fields and elements for a user to select a group of signals that are to be detected from a recorded interaction and the operators by which to combine the group of signals into a combined signal. For example, the user can be an administrative user that is configuring a set of interaction recording processing configuration information to use to programmatically evaluate (e.g., perform quality assurance) the performance of one or more participants within a recorded interaction (e.g., a recorded call between a customer service agent and a customer). User interface 400 shows that the combined signal 404 that is to be configured is related to the topic/category of "Finance Probing." Key phrases section 408 shows a list of key phrases (each of which is a signal that is to be detected from an interaction) from which the user can select to populate into field 406. While not shown in FIG. 4, a user interface such as user interface 400 can provide an element that if selected, enables the user to submit or otherwise customize additional key phrases (signals) to add to the list under key phrases section 408. As shown in user interface 400, each key phrase under key phrases section 408 includes a corresponding "DEL" button that, if selected, causes the corresponding key phrase to be hidden or removed from being eligible to be selected. As shown in user interface 400, each key phrase under key phrases section 408 is currently associated with the Boolean signal type for which "Present" (which is shown as the current selection in type dropdown menu 410) indicates that the signal was found in the interaction and is associated with the speaker (the participant role) of "Agent" (based on the current selection in speaker dropdown menu 412). If the users were to select a different selection for signal type in type dropdown menu 410, then the key phrases in key phrases section 408 may refresh with predetermined key phrases associated with the newly selected type (and the selected speaker). If the users were to select a different selection for speaker in the speaker dropdown menu 412, then the key phrases in key phrases section 408 may refresh with predetermined key phrases associated with the newly selected speaker (and the selected signal type).

For example, each key phrase (signal) under key phrases section 408 can be selected to add to the group of signals that are to be combined for the topic/category of "Finance Probing." In response to the selection of a particular key phrase, the key phrase can be populated into field 406. To add an operator between adjacent key phrases, add operator button 402 can be selected to select an operator among the operator options (e.g., DIALOG_NEAR, AND, NEAR, and OR). Furthermore, brackets and other syntax can be directly typed into field 406 to dictate the order/sequence of operations to be performed on the grouping of key phrases.

The current example grouping of key phrases and their respective operators that are shown in field 406 for the combined signal associated with "Finance Probing" is {"Has a balance of" OR "With total balance" OR "The balance is"}. Given that each of the three key phrases (which are different variations on asking for the balance) in the grouping is associated with the signal type of "Present" and the speaker of "Agent," the combined signal will return "Present" (or "True") in the event that the agent has spoken any of the key phrases (signals) ("Has a balance of," "With total balance," or "The balance is") within the recorded interaction (e.g., a recorded phone call). As shown in the example of FIG. 4, a combined signal can be used to capture that any of multiple variations of a key phrase were present in the interaction. In contrast, conventionally, to detect that a key phrase is present in an interaction, typically the exact wording of the key phrase needs to be found within the interaction. The inflexibility of this conventional approach can often overlook the presence of a variation of a key phrase.

While not shown in user interface 400, another portion of the same set of interaction recording processing configuration information may include event criteria that prescribe that the agent has satisfactorily performed finance probing of the customer in the event that the combined signal related to "Finance Probing" is "Present" (or is "True").

While not shown in user interface 400, the user interface may also include elements that enable the user to dictate weights to attribute to different signals that are to be combined into a combined signal.

Figure 5:
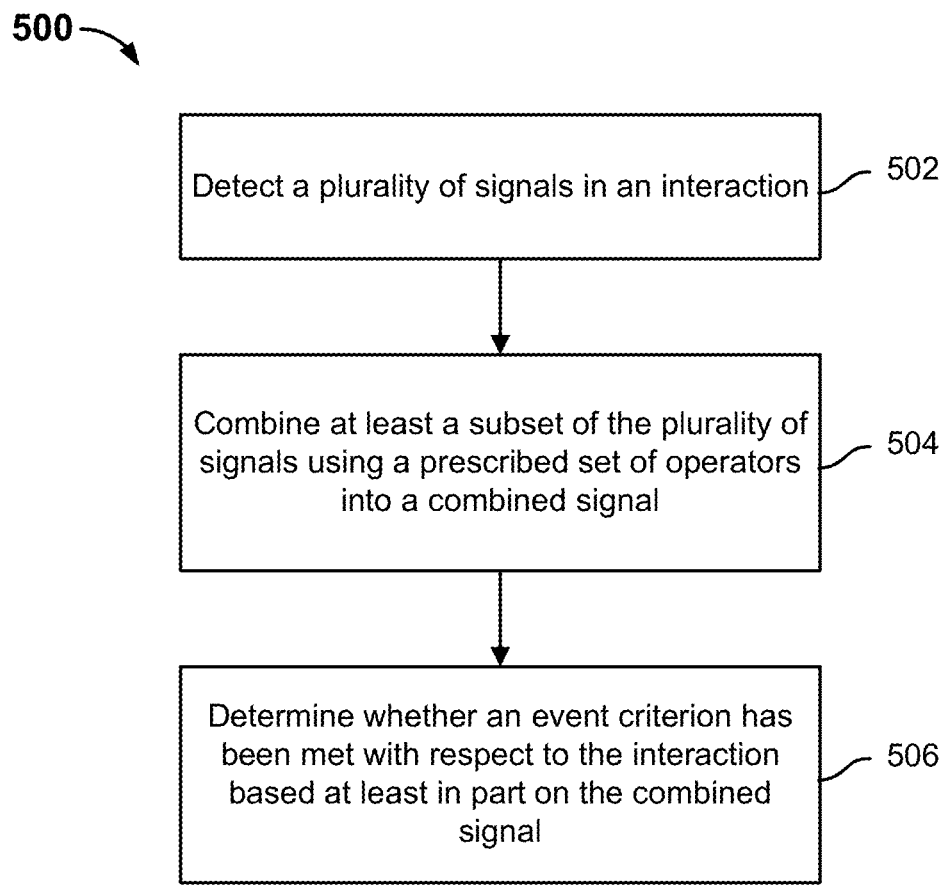
FIG. 5 is a flow diagram showing an embodiment of a process for performing automatic evaluations of recorded interactions.

FIG. 5 is a flow diagram showing an embodiment of a process for performing automatic evaluations of recorded interactions. In some embodiments, process 500 can be implemented, at least in part, on event evaluation server 108 of system 100 of FIG. 1.

At 502, a plurality of signals is detected in an interaction. The interaction is a recorded interaction such as, for example, a series of text-based messages (e.g., emails, chat log), a phone call, or a video. In some embodiments, the interaction comprises text, audio, and/or video components. In some embodiments, if text is not included in the interaction, the audio portion is transcribed into at least two sets of text streams, where each text stream is associated with the speech of a distinct participant in the interaction. For example, each text stream includes each word that was uttered by a corresponding speaker/participant as well as the approximate time within the interaction at which the word was uttered. In some embodiments, signals that are described in a set of interaction recording processing configuration information are detected within the interaction. For example, signals can be detected using keyword spotting and/or machine learning. Signals can be detected from a single text stream (associated with one participant of a particular role) or across multiple text streams (associated with more than one participant associated with different roles).

At 504, at least a subset of the plurality of signals is combined using a prescribed set of operators into a combined signal. Subsets of two or more detected signals can be grouped together according to the set of interaction recording processing configuration information. For example, the set of interaction recording processing configuration information could prescribe which two or more signals are to be combined together, the sequence/order in which the signals are to be combined, and the operators (e.g., DIALOG_NEAR, AND, NEAR, and OR) that are to be used to combine the signals.

At 506, whether an event criterion has been met with respect to the interaction is determined based at least in part on the combined signal. The combined signal is compared to the event criteria included in the set of interaction recording processing configuration information to determine whether the combined signal (along with other combined signals that were determined from signals that were detected from the interaction) meets the conditions that indicate whether an event (likely) occurred (e.g., was performed by a specified participant) within the interaction and/or a qualitative assessment of how well that event occurred within the interaction.

Figure 6:
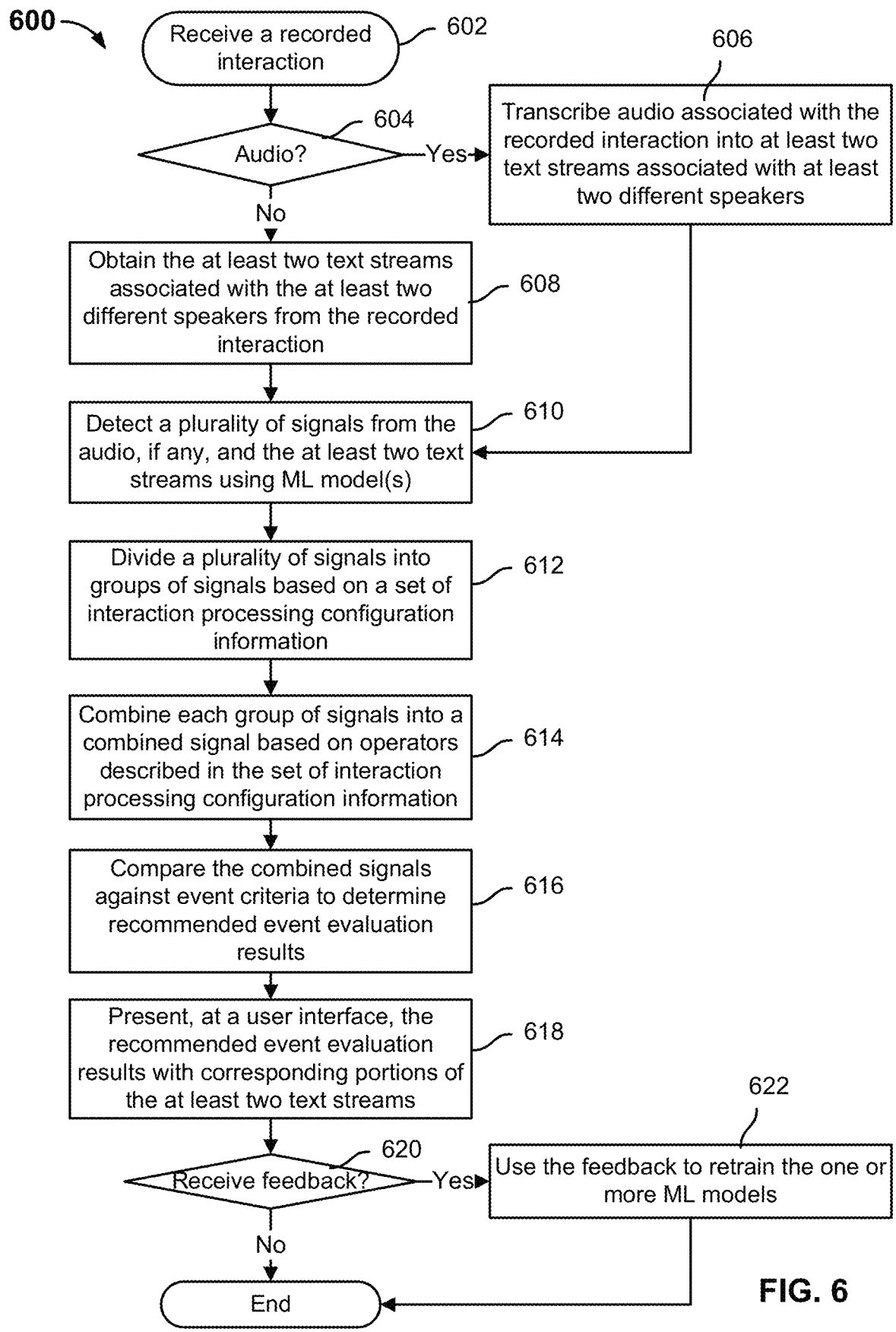
FIG. 6 is a flow diagram showing an example of a process for performing automatic evaluations of recorded interactions.

FIG. 6 is a flow diagram showing an example of a process for performing automatic evaluations of recorded interactions. In some embodiments, process 600 can be implemented, at least in part, on event evaluation server 108 of system 100 of FIG. 1. In some embodiments, process 500 of FIG. 5 may be implemented using process 600.

At 602, a recorded interaction is received. As mentioned above, a recorded interaction can be, for example, a series of text-based messages (e.g., emails, chat log), a phone call, or a video. In some embodiments, the interaction comprises text, audio, and/or video components.

At 604, whether the recorded interaction includes audio is determined. In the event that the recorded interaction includes audio, control is transferred to 606. Otherwise, in the event that the recorded interaction does not include audio, control is transferred to 608. For example, an interaction that comprises a recorded phone call or a recorded video includes an audio portion that includes the recorded speech uttered by two or more speakers (participants in the interaction). For example, an interaction that comprises a series of emails or a chat may not include an audio portion.

At 606, audio associated with the recorded interaction is transcribed into at least two text streams associated with at least two different speakers. The audio portion of the recorded interaction is transcribed in text streams corresponding to respective distinct speakers in the interaction. In some embodiments, the recorded interaction comprises multiple channels of audio and where each audio channel is associated with a corresponding speaker. In such instances, each audio channel can be separately transcribed to determine the text stream corresponding to a respective speaker. In some embodiments, the recorded interaction comprises a single channel of audio and so diarisation is performed on the audio channel to divide the audio into segments associated with distinct speakers. In such instances, audio segments corresponding to the same speaker are transcribed to obtain the text stream corresponding to that speaker.

At 608, the at least two text streams associated with the at least two different speakers are obtained from the recorded interaction. If the recorded interaction already included text (e.g., the recorded interaction is a series of emails or a chat log), then the text can be divided into text streams corresponding to different writers. Otherwise, if the recorded interaction included audio (but not text), then at step 606, the audio was transcribed into multiple streams of text as described above.

At 610, a plurality of signals is detected from the audio, if any, and the at least two text streams using machine learning (ML) model(s). Machine learning models that are configured to detect one or more types of signals from audio and/or text are used to detect signals from the audio (e.g., associated with each speaker) and the text streams (e.g., associated with respective speakers). In some embodiments, in addition to machine learning models, keyword spotting can also be used to detect signals among the audio and/or text streams. As mentioned above, a signal type can comprise a category, a floating value, a Boolean value, or a string value, for example. Examples of signals include key phrases, dialogue, intent, sentiment, speaking speed, entity question, articulation, and profanity. A signal can perform a task such as match, identify, estimate, or classify. Signals are generic across different use cases. Further details on example signals are described below.

At 612, a plurality of signals is divided into groups of signals based on a set of interaction processing configuration information. Two or more of the detected signals are grouped together based on the combined signals that are described in a set of interaction recording processing configuration information associated with a specified objective that matches an attribute associated with the recorded interaction. For example, the specified objective describes the context or application of the recorded interaction to which the processing should be applied. In some embodiments, a detected signal can be included in more than one combined signal. In some embodiments, a detected signal need not be combined into any combined signals.

At 614, each group of signals is combined into a combined signal based on operators described in the set of interaction processing configuration information. A group of signals that is described to be combined together according to the set of interaction recording processing configuration information is combined using operators described in the set of interaction recording processing configuration information. As mentioned above, a type of a combined signal can comprise a category, a floating value, a Boolean value, or a string value, for example.

At 616, the combined signals are compared against event criteria to determine recommended event evaluation results. The event criteria are described in the set of interaction recording processing configuration information. An event criterion describes the conditions pertaining to combined signals that indicate whether one or more events had (likely) occurred within the interaction and/or a qualitative assessment of how a particular speaker within the interaction had performed. For example, an event criterion can specify that if Combined Signals A, B, and C were all present, then the speaker associated with the "agent" role within the interaction had satisfactorily obtained all the needed financial information that was needed from the speaker associated with the "customer" role.

At 618, the recommended event evaluation results are presented, at a user interface, with corresponding portions of the at least two text streams. The recommended event evaluation results corresponding to one or more events are presented, optionally, with the detected signals or the determined combined signals, at a user interface. For example, a user that is to evaluate the interaction can quickly do so based on the recommended event evaluation results.

At 620, whether feedback to the recommended event evaluation results is received is determined. In the event that feedback to the recommended event evaluation results is received, control is transferred to 622. Otherwise, in the event that feedback to the recommended event evaluation results is not received, process 600 ends. A user may provide feedback to the presented recommended event evaluation results after manually reviewing at least a portion of the interaction. The feedback can provide a correction to the recommended event evaluation results corresponding to an event.

At 622, the feedback is used to retrain the ML model(s). The machine learning model(s) that had detected signals that were combined into the combined signals which were compared to event criteria associated with the corrected recommended event evaluation results can be retrained/updated/modified based on the user provided feedback/correction.

Figure 7:
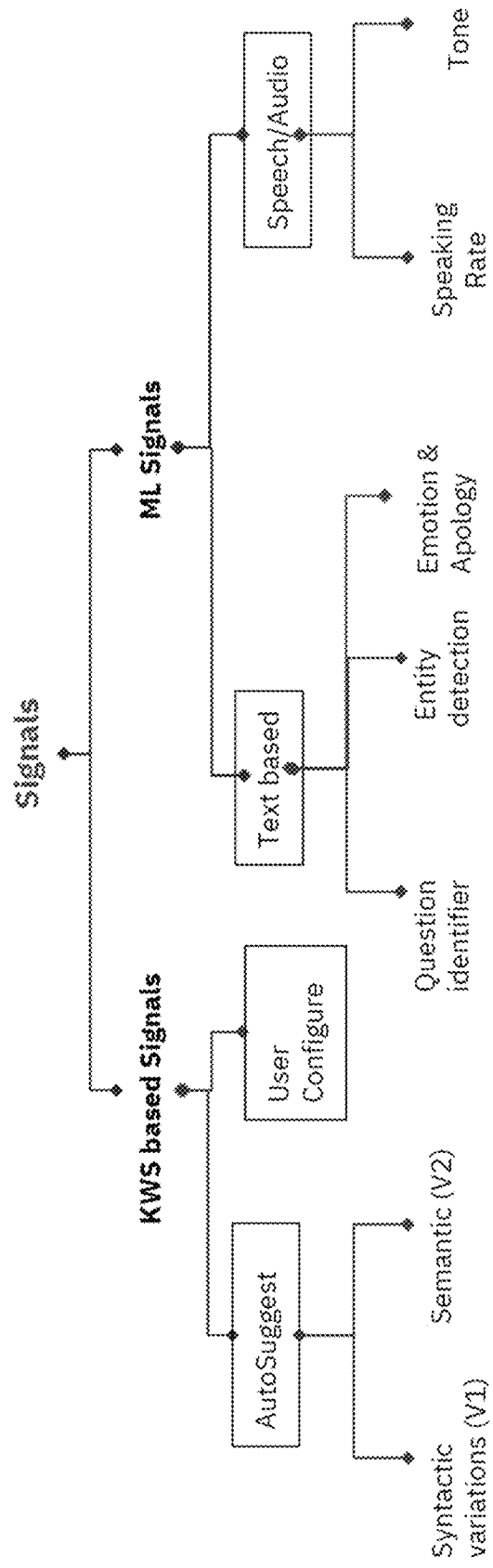
FIG. 7 is a diagram showing an example of a tree that shows relationships among example signals that can be detected from a recorded interaction.

FIG. 7 is a diagram showing an example of a tree that shows relationships among example signals that can be detected from a recorded interaction. As shown in the example, the signals can be broadly divided into two types: "KWS based signals" (keyword-based signals) and "ML signals" (machine learning-based signals). Examples of KWS-based signals include phrases or words from the text of an interaction that match user configured reference key phrases or variations on programmatically suggested key phrases. Examples of ML signals include signals ("question identifier," "entity detection," "emotion & apology") that can be detected from the text streams associated with the interaction and signals ("speaking rate," "tone") that can be detected from the recorded speech/audio of the interaction. The signals shown in FIG. 7 are merely examples of signals and their categories that can be detected from the audio and/or text of a recorded interaction and in practice, other types of signals can be detected from a recorded interaction using at least keyword spotting, machine learning, and/or other techniques.

The following are some example signals and how they can be detected from a recorded interaction in accordance with some embodiments:

1) Articulation

For example, this signal detects for whether a participant with a specified role (e.g., a customer service agent) in a recorded interaction was speaking clearly. In some embodiments, to determine the articulation signal (which returns a Boolean value of true or false), machine learning is applied to the text stream associated with a participant with a specified role (e.g., a customer service agent) to identify portions/timestamps associated with predetermined words (e.g., "payment," "authentication," "verification"). Then, audio segments corresponding to the identified portions/timestamps of the text stream corresponding to the participant with a specified role are obtained. Machine learning is applied to those audio segments to identify the phonemes uttered during those audio segments and the identified phonemes are compared against known phonemes of the predetermined words to determine a similarity. In the event that the similarity between the identified phonemes and the known phonemes is greater than a threshold, then the articulation signal corresponding to the participant with a specified role will return "true." Otherwise, in the event that the similarity between the identified phonemes and the known phonemes is not greater than a threshold, then the articulation signal corresponding to the participant with a specified role will return "false."

2) Speaking Rate

For example, this signal detects the rate at which a participant with a specified role (e.g., a customer service agent) was in a recorded interaction. For example, the speaking rate of a participant with a specified role can be determined by programmatically determining the number of words that the participant had spoken as transcribed in their text stream over a given length of time divided by that length of time. The speaking rate signal can return a numerical value.

3) Intent

For example, this signal detects the intent of a participant with a specified role (e.g., a customer service agent) within at least certain portions of a recorded interaction. For example, the intent of the participant with a specified role can be determined by applying machine learning (e.g., natural language processing) to either the text stream and/or the audio stream associated with that participant to detect for one or more types of intent based on the text transcription and/or utterances of words. The intent signal can return a string value corresponding to the determined intent.

4) Key Phrases

For example, this signal detects exact phrases or variations of phrases. For example, the key phrase signal can be used to determine whether a desired recitation (e.g., a mini Miranda, a recorded line, a call opening greeting, a call ending closing) or an undesired phrase (e.g., a profanity) was said by a participant with a specified role (e.g., a customer service agent) within a recorded interaction. For example, the key phrases that are said by the participant with a specified role can be determined by applying machine learning (e.g., natural language processing) to either the text stream and/or the audio stream associated with that participant to detect for one or more types of predetermined key phrases or variations on a key phrase based on the text transcription and/or utterances of words. The key phrase signal can return a Boolean value indicating whether the key phrase was present (e.g., "true") or not (e.g., "false") in the interaction.

5) Dialogue Indicating a Key Phrase Plus Action

For example, this signal detects whether a participant with a specified role has asked a predetermined question and also performed a follow up action. For example, this signal can detect whether the participant with a specified role (e.g., the customer service agent) has verified contact information and updated the customer's account, detected a wrong number and removed the incorrect phone number from the customer's account, and/or suggested an alternative payment method for failures. For example, the dialogue indicating key phrases plus action signal can be determined by applying machine learning (e.g., natural language processing) to snippets/segments of conversation between a first participant associated with a first role (e.g., a customer service agent) and a second participant associated with a second role (e.g., a customer) across their respective text streams and/or audio streams to detect for one or more types of predetermined key phrases or variations on a key phrase followed (temporally) by the first participant's spoken confirmation of a performed action. The dialogue indicating key phrases plus action signal can return a Boolean value indicating whether the dialogue indicating key phrases plus action was present (e.g., "true") or not (e.g., "false") in the interaction.

6) Dialogue Prompting a Negative Response

For example, this signal detects whether a participant with a specified role has said phrases that led to a negative response (e.g., silence/dead air) by another participant with another specified role. For example, this signal can detect whether the participant with a specified role (e.g., the customer service agent) has said something that led to a negative response (e.g., a negative sentiment, silence/dead air, overtalk) from the other participant with another specified role (e.g., the customer). For example, the dialogue prompting a negative response signal can be determined by applying machine learning (e.g., natural language processing) to snippets/segments of conversation between a first participant associated with a first role (e.g., a customer service agent) and a second participant associated with a second role (e.g., a customer) across their respective text streams and/or audio streams to detect across the semantic (text) cues and acoustic (audio) cues for the first participant's utterances that were followed (temporally) by the second participant's negative response. The dialogue prompting a negative response signal can return a Boolean value indicating whether the dialogue prompting a negative response was present (e.g., "true") or not (e.g., "false") in the interaction.

7) Providing Correct Information

For example, this signal detects whether a participant with a specified role (e.g., customer service agent) provided information that can be verified using stored data (e.g., a predetermined database, a predetermined knowledge base). For example, this signal can detect whether the participant with a specified role (e.g., the customer service agent) gave the correct payment information or correctly scheduled a service appointment. For example, the providing a correct information signal can be determined by applying machine learning (e.g., natural language processing) to the text stream of a participant associated with a role (e.g., a customer service agent) to determine the presence of a key phrase and then verifying the provided information that follows the key phrase against stored data. The providing a correct information signal can return a Boolean value indicating whether information was correctly provided (e.g., "true") or not (e.g., "false") in the interaction.

Other example signals that can be detected across the text and/or audio streams of one or more participants in a recorded interaction include determining whether active listening was present, churn prediction, whether a participant placed the call on hold for longer than a predetermined length of time, and the number of times that a participant had addressed another participant by the other participant's name.

Figure 8:
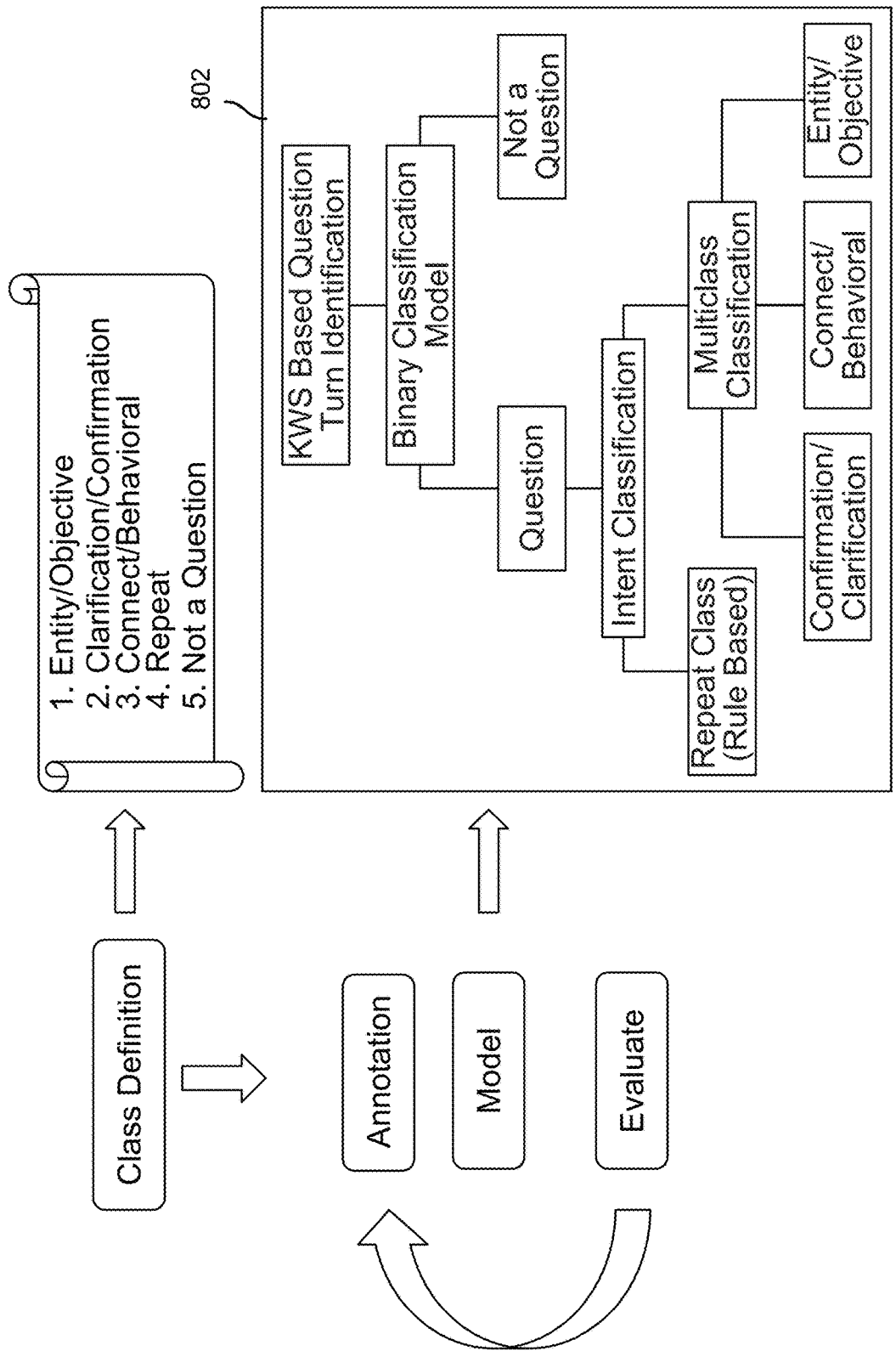
FIG. 8 describes an example schematic of a process for training a machine learning model for detecting and classifying a question in a recorded interaction.
Figure 9:
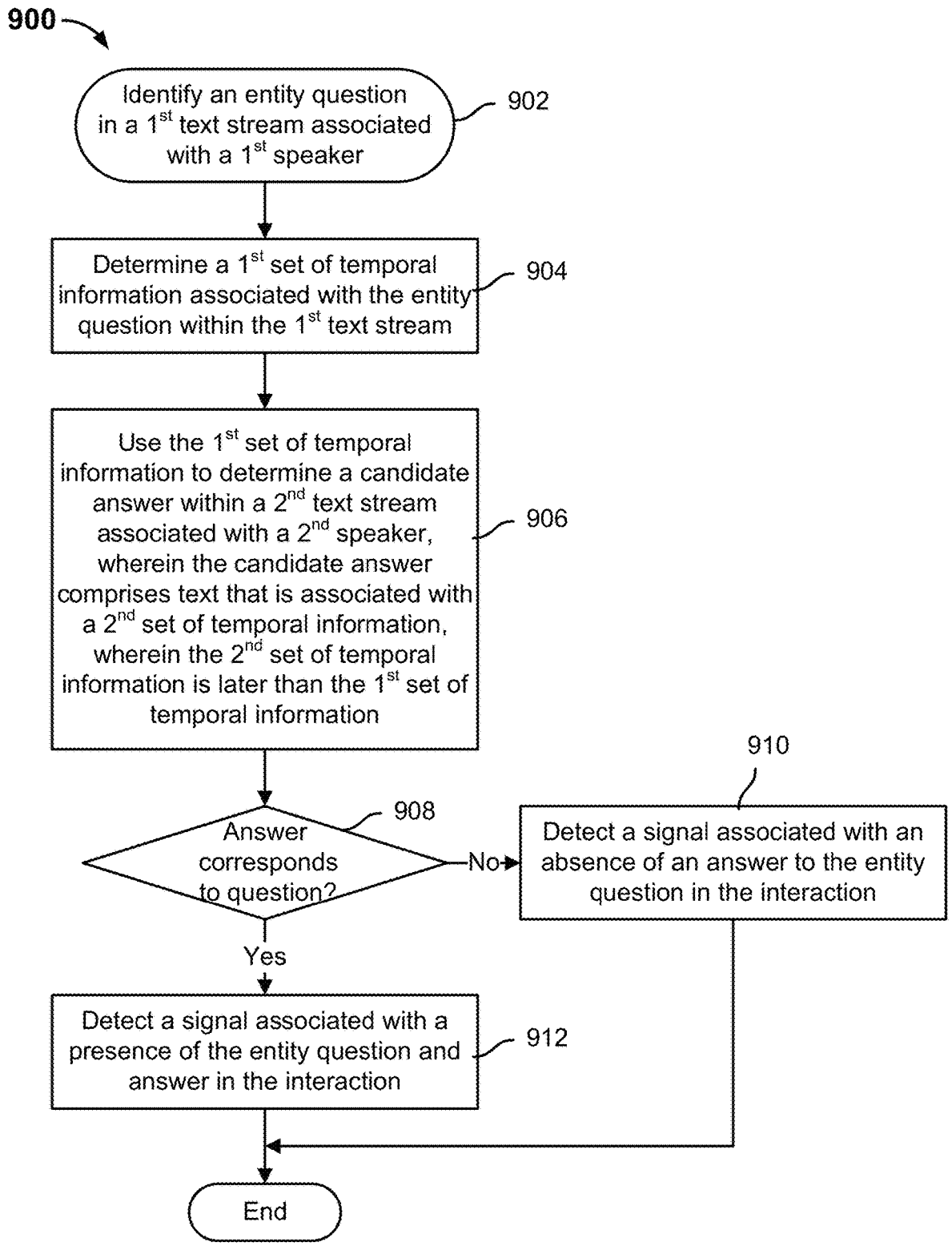
FIG. 9 is a flow diagram showing an example process of detecting an entity question and a provided entity answer signal.

FIGS. 8, 9, and 10, as will be explained below, describe techniques and examples associated with detecting an entity question and/or a provided entity answer signal in a recorded interaction. In various embodiments, an "entity question" is a question that seeks out a particular piece of information. For example, an entity can be a name, an address, a credit card information, a phone number, or another piece of personal identifying information.

FIG. 8 describes an example schematic of a process for training a machine learning model for detecting and classifying a question in a recorded interaction. As shown in FIG. 8, the machine learning model is configured to output an input text as one of five possible classifications/categories: 1. Entity/Objective, 2. Clarification/Confirmation, 3. Connect/Behavioral, 4. Repeat, and 5. Not A Question. The example machine learning model is shown to process the input text according to the possible paths shown in tree 802. The model is trained with training data comprising text that is annotated with its correct question classification. To test the model, classification output by the model is evaluated and then used to further train the model, if needed, so that the model is improved on its classification of input text into the corresponding categories.

FIG. 9 is a flow diagram showing an example process of detecting an entity question and a provided entity answer signal. In some embodiments, process 900 can be implemented, at least in part, on event evaluation server 108 of system 100 of FIG. 1.

Process 900 describes an example process for detecting a signal that comprises a detected entity question that is asked by a first speaker associated with a first specified role (e.g., the customer service agent role) and a detected follow up answer corresponding to that entity question that is provided by a second speaker associated with a second specified role (e.g., the customer role). Furthermore, in the example of process 900, the signal type is a Boolean value indicating either "true" (the entity question and a corresponding answer were both present) or "false" (the entity question and a corresponding answer were not both present), which can advantageously avoid returning/persisting/exposing potentially sensitive information (e.g., personally identifying information) that may be provided in response to an entity question. Put another way, when signals are used to detect the presence of certain information but not save that information, the presence of sensitive (e.g., personal identifying) information can still be programmatically detected but not stored, which helps to ensure the privacy of the participants whose interactions are being reviewed.

At 902, an entity question is identified in a first text stream associated with a first speaker. As mentioned above, an "entity question" is a question that is seeking a piece of information, which is referred to as the "entity." Examples of an entity include a name, an address, a credit card information, a phone number, or other personal identifying information. In some embodiments, the entity question in the signal can pertain to a particular entity and different signals can detect for different types of entity questions. In some embodiments, the text stream that is associated with a speaker/participant of a first specified role (e.g., customer service agent) is input into one or more machine learning models that have been trained to recognize entity questions to identify a portion of the text stream, if any, that includes an entity question. For example, the entity question can be determined using a machine learning model that is generated according to the example schematic of FIG. 8.

At 904, a first set of temporal information associated with the entity question is determined within the first text stream. The start and end timestamps of the identified entity question within the first text stream associated with the first speaker are identified. For example, the start timestamp indicates when the entity question was started to be asked in the recorded interaction and the end timestamp indicates when the asking of the entity question was completed in the recorded interaction.

At 906, the first set of temporal information is used to determine a candidate answer within a second text stream associated with a second speaker, wherein the candidate answer comprises text that is associated with a second set of temporal information, wherein the second set of temporal information is later than the first set of temporal information. Because the entity answer, if any, in response to the identified entity question should appear later in time in the duration of the interaction, a corresponding entity answer to the entity question is looked for within the text stream associated with the second speaker associated with a second specified role at a range of time that follows/is later than the temporal information (e.g., the end timestamp) of the identified entity question. For example, machine learning that has been trained to recognize the type of answer that would be provided in response to the type of entity question that was identified is applied to the portion of the text stream of the second speaker associated with timestamps later than the end timestamp of the identified entity question to look for whether the appropriate answer is present in the text stream of the second speaker.

In a first example, if the entity question asked for a customer's credit card number, then machine learning or keyword spotting techniques would be used to identify whether the portion (the candidate answer) of the customer's text stream associated with timestamps after the end timestamp of the entity question includes information that conforms to the template/attributes/pattern of a credit card number. In a second example, if the entity question asked for a customer's address, then machine learning or keyword spotting techniques would be used to identify whether the portion (the candidate answer) of the customer's text stream associated with timestamps after the end timestamp of the entity question includes information that conforms to the template/attributes/pattern of an address.

At 908, whether the candidate answer corresponds to the entity question is determined. In the event that the candidate answer corresponds to the entity question, control is transferred to 912. Otherwise, in the event that the candidate answer does not correspond to the entity question, control is transferred to 910. Whether an answer that appropriately corresponds to the asked entity question can or cannot be found in the text stream associated with the second speaker at timestamps that follow the end timestamp associated with the entity question is determined.

At 910, a signal associated with an absence of an answer to the entity question in the interaction is detected. In the event that an answer that appropriately corresponds to the posed entity question is found, then the signal returns a true value, which indicates the presence of both the entity question and its answer within the dialogue between the two speakers.

At 912, a signal associated with a presence of the entity question and answer in the interaction is detected. In the event that no answer that appropriately corresponds to the posed entity question is found, then the signal returns a false value, which indicates an absence of the answer to the entity question within the dialogue between the two speakers.

While process 900 describes applying machine learning to text streams of different speakers, in other example, machine learning can additionally or alternatively be applied to audio streams of different speakers to identify the presence of the entity question and the presence of a corresponding answer.

FIG. 10 is a diagram showing an example of detecting entity question type signals from a dialog comprising two text streams corresponding to two different speakers in a recorded interaction. In the example dialog shown in FIG. 10, the recorded interaction is a recorded phone call between a first speaker comprising a customer service agent (e.g., in a call center) and a second speaker comprising a customer. The audio of the recorded phone call was transcribed into two text streams, one associated with the customer service agent ("agent") role and the other associated with the customer role. In the example of FIG. 10, several signals of the type that determined whether entity questions were present are detected among the text streams of the agent role and the customer role. Machine learning (e.g., natural language processing) was applied to the agent's text snippet "mam may I know you[r][d] ate of birth and last [four] digits of s s n" 1002 to determine that an entity question that asks for the entity of social security number is present in that snippet. Machine learning (e.g., natural language processing) was applied to the customer's text snippet "how long will it take I'm already sick of calling you guys thrice to date" 1004 to determine that an entity question that asks for the entity of length of time for a response is present in that snippet. Machine learning (e.g., natural language processing) was applied to the customer's text snippet "just a min mam so what I see what I notice is that your loan application has not reached yes I mean to say that [it's] in our records I need to check why who as in what is causing the delay I'm really sorry for that" 1006 to determine that an entity question was not present in that snippet. Machine learning (e.g., natural language processing) was applied to the customer's text snippet "this is so unexpected when can I get a closure to process my loan" 1008 to determine that an entity question that asks for when a closure can be expected was present in that snippet.

Figure 11:
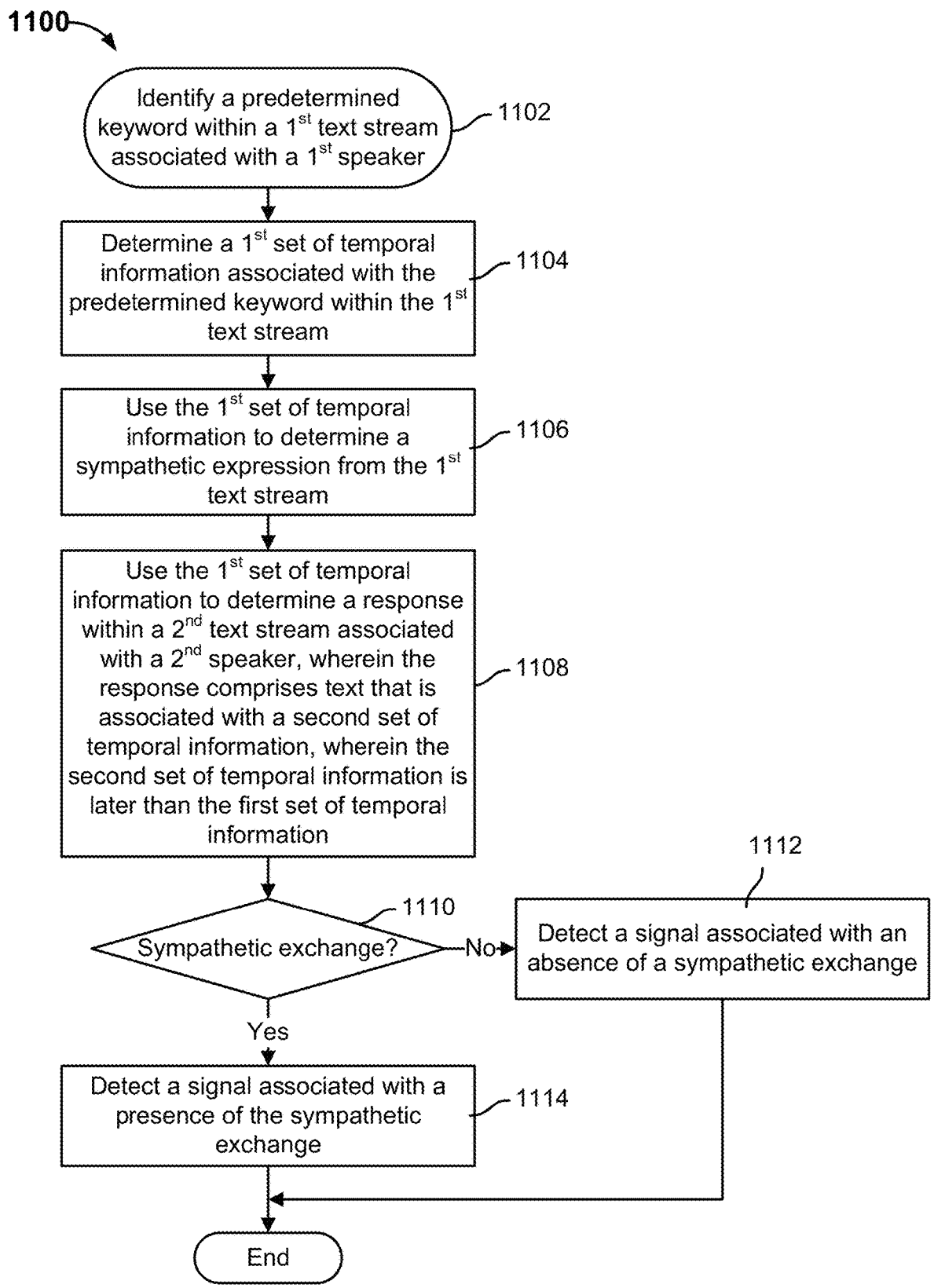
FIG. 11 is a flow diagram showing an example process of detecting a sympathetic exchange signal.

FIG. 11 is a flow diagram showing an example process of detecting a sympathetic exchange signal. In some embodiments, process 1100 can be implemented, at least in part, on event evaluation server 108 of system 100 of FIG. 1.

Process 1100 describes an example process for detecting a signal that comprises a sympathetic expression (e.g., an empathetic expression) that is provided by a first speaker associated with a first specified role (e.g., the customer service agent role) that is followed by a corresponding response (e.g., an acknowledgment or expression of gratitude) from a second speaker associated with a second specified role (e.g., the customer role). Furthermore, in the example of process 1100, the signal type is a Boolean value indicating either "true" (the sympathetic exchange was present) or "false" (the sympathetic exchange was not present).

At 1102, a predetermined keyword is identified within a first text stream associated with a first speaker. For example, the predetermined keyword comprises a keyword that commonly appears among expressions of sympathy. Examples of expression of sympathy are "I'm sorry," "I apologize," and "My apologies." As such, examples of a predetermined keyword that is associated with sympathetic expressions may include "sorry," "apologize," and "apologies." In some embodiments, the text stream that is associated with a speaker/participant of a first specified role (e.g., customer service agent) is input into one or more machine learning models that have been trained to recognize predetermined keywords to identify a portion of the text stream, if any, that includes a predetermined keyword.

At 1104, a first set of temporal information associated with the predetermined keyword is determined within the first text stream. A timestamp of the identified predetermined keyword within the first text stream associated with the first speaker is identified. For example, the timestamp indicated when the predetermined keyword was uttered in the recorded interaction.

At 1106, the first set of temporal information is used to determine a sympathetic expression from the first text stream. For example, a neighborhood of text around and including the predetermined keyword is determined from the first text stream associated with the first speaker (e.g., the customer service agent) and input into one or more machine learning models to determine whether the input text includes a recognized sympathetic expression (that may include the predetermined keyword).

At 1108, the first set of temporal information is used to determine a response within a second text stream associated with a second speaker, wherein the response comprises text that is associated with a second set of temporal information, wherein the second set of temporal information is later than the first set of temporal information. Because a response (e.g., an acknowledgement or an expression of gratitude), if any, in response to the identified sympathetic expression should appear later in time in the duration of the interaction, a corresponding response to the sympathetic expression is looked for within the text stream associated with the second speaker associated with a second specified role at a range of time that follows/is later than the temporal information (e.g., the timestamp) of the identified sympathetic expression. For example, machine learning that has been trained to recognize the type of response that would be provided in response to the sympathetic expression that was identified is applied to the portion of the text stream of the second speaker associated with timestamps later than the timestamp of the identified sympathetic expression to look for whether a corresponding response is present in the text stream of the second speaker.

For example, if the sympathetic expression indicated apologies for the customer's troubles, then machine learning techniques would be used to identify whether the portion of the customer's text stream associated with timestamps after the timestamp of the sympathetic expression includes information that conforms to the template/attributes/pattern of an expression of gratitude (e.g., "thank you").

At 1110, whether the response corresponds to the sympathetic expression is determined. In the event that the response corresponds to the sympathetic expression, control is transferred to 1114. Otherwise, in the event that the response does not correspond to the sympathetic expression, control is transferred to 1112. Whether a response that appropriately corresponds to the sympathetic expression can or cannot be found in the text stream associated with the second speaker at timestamps that follow the timestamp associated with the sympathetic expression is determined.

At 1114, a signal associated with a presence of the sympathetic exchange is detected. In the event that a response that appropriately corresponds to the provided sympathetic expression is found, then the signal returns a value of "true," which indicates the presence of both the sympathetic expression and a corresponding response within the dialogue between the two speakers.

At 1112, a signal associated with an absence of the sympathetic exchange is detected. In the event that a response that appropriately corresponds to the provided sympathetic expression is not found, then the signal returns a value of "false," which indicates the absence of the response to the sympathetic expression.

For the example type of recorded interaction, the recorded service call, the following are types of signals (and specific examples of signals within each type) that can be detected from that recorded call:

1) Text-based signals: word match (including synonyms), part-of-speech (POS), entity recognizer (e.g., people/business/address/cost or charges/credit card detector), common intent classifiers/identifiers (e.g., call opening, verification, recording disclosure to cover call process, sentiment, profanity, question detectors, personal identification information (PII) vs no-PII)
2) Intents: greeting, verification, confirmation, courtesy, excitement (e.g., "awesome," "great"), recommendation, resolution, acknowledgement, next-steps, assumptive, payment failure (ERC)
3) Speech-based signals: silence duration, energy, pitch, sentiment, interruptions, smile/laughter, coughing/clearing throat, filler words
4) Temporal Signals: speaker turns, part of call (e.g., initial or 10%), repetitions versus recaps, interruptions by agent, overtalk
5) Segmental/Call-level Signals: speaking rate, talk-to-listen, speech versus silence, confident (e.g., words like "I can do"), voice is clear or strong FIG. 12 is a diagram that shows examples of some signals that are detected from a recorded interaction and also a combined signal that is determined by combining those signals together. In the example of FIG. 12, seven signals (S1 through S7) are extracted from either the text stream associated with the customer service agent or the text stream associated with the customer associated with a recorded phone call between the customer service agent and the customer. While the example signals of FIG. 12 are detected using either keyword spotting (KWS) or machine learning (ML), in other examples, signals can be detected from an interaction using other techniques as well. Signal S1 comprising the presence of a person name entity identifier (this signal identifies instances of person names) is detected in the customer service agent's text using machine learning. Signal S2 comprising phrases hinting at an "agent introduction" is detected in the customer service agent's text using keyword spotting. Signal S3 comprising a person name entity identifier is detected in the customer's text using machine learning. Signal S4 comprising phrases hinting at a "customer name verification" is detected in the customer service agent's text using keyword spotting. Signal S5 comprising an entity question identifier is detected in the customer service agent's text using machine learning. Signal S6 comprising phrases hinting at a "date of birth verification" is detected in the customer's text using keyword spotting. Signal S7 comprising phrases hinting at a "social security number/address verification" is detected in the customer's text using keyword spotting. After the seven signals (S1 through S7) are detected from the recorded interaction, they are combined into a single combined signal using operators that are prescribed by a set of interaction processing configuration information that matches the attribute(s) of the recorded interaction, as shown in FIG. 12. In the example of FIG. 12, the combined signal is of a Boolean ("Yes" or "No") type. The combined signal is then compared, along with other combined signals that have been derived from the same recorded interaction, to event criteria to determine whether the combined signal(s) satisfy the criteria. Satisfaction of criteria associated with an event could indicate that the event had (likely) occurred within the recorded interaction and/or a qualitative assessment with respect to how well that event was performed within the recorded interaction.

Figure 13:
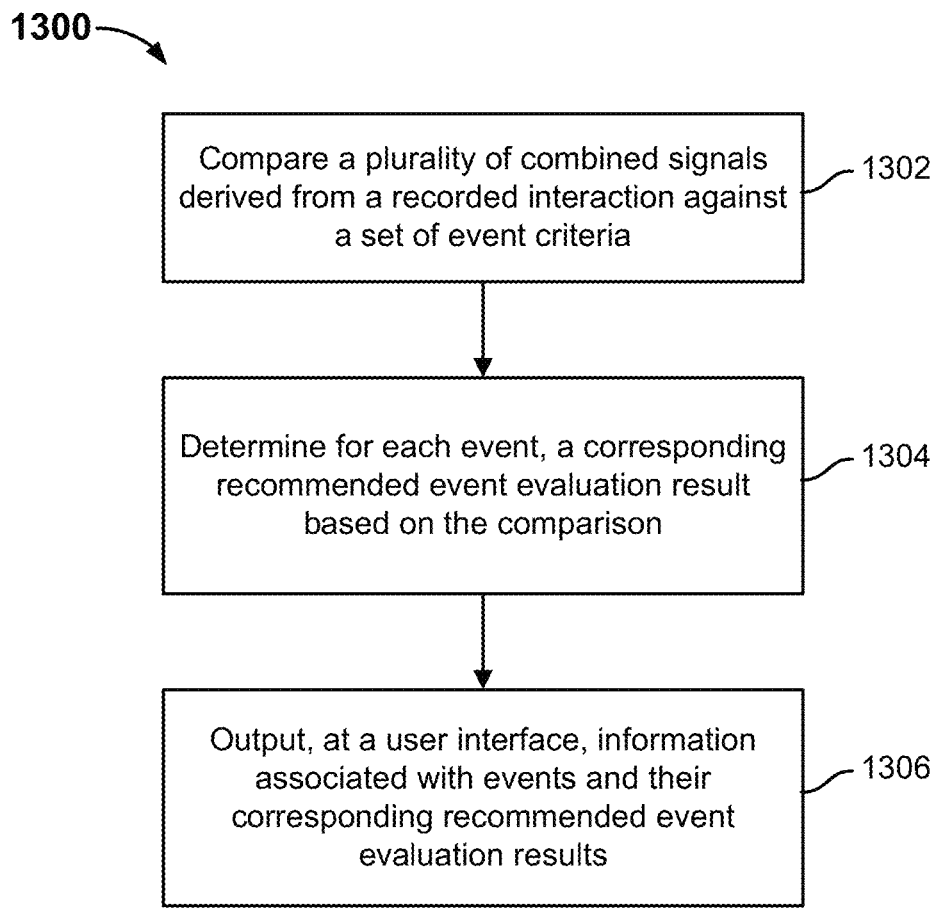
FIG. 13 is a flow diagram showing an example process of determining and outputting recommended event evaluation results associated with a recorded interaction in accordance with some embodiments.

FIG. 13 is a flow diagram showing an example process of determining and outputting recommended event evaluation results associated with a recorded interaction in accordance with some embodiments. In some embodiments, process 1300 can be implemented, at least in part, on event evaluation server 108 of system 100 of FIG. 1. In some embodiments, step 506 of process 500 of FIG. 5 can be implemented using process 1300.

At 1302, a plurality of combined signals derived from a recorded interaction is compared against a set of event criteria. As described above, signals detected from a recorded interaction can be combined into combined signals according to the groupings and operators that are prescribed by a relevant set of interaction processing configuration information. The same set of interaction processing configuration information could also include event criteria that includes conditions that relate combined signals to recommended event evaluation results for each of one or more events. In a first example, an event criterion can describe that if Combined Signals A and B both have the value of "true," then a corresponding event was satisfactorily performed by a participant with a specified role within the recorded interaction. In a second example, an event criterion can describe that if only Combined Signal A has the value of "true" but that Combined Signal B has the value of "false," then a corresponding event was not satisfactorily performed by a participant with a specified role within the recorded interaction.

At 1304, a corresponding recommended event evaluation result is determined for each event based on the comparison.

At 1306, information associated with events and their corresponding recommended event evaluation results is output at a user interface. For example, descriptions of events and their determined recommended event evaluation results are output at a user interface. Also, signals that were used to generate combined signals that were compared against event criteria can also be presented at the user interface, along with the portions/snippets/segments of the text and/or audio streams from which the signals were detected. The user interface can facilitate a user to efficiently evaluate (e.g., the quality associated with) the recorded interaction by reviewing the presented recommended event evaluation results. The user interface may also provide interactive elements that the user can use to provide user feedback to the recommended event evaluation results. For example, upon manually reviewing (e.g., listening to the audio and/or reading the text transcriptions of) portions of the recorded interaction, the user may determine that at least some of the recommended event evaluation results should be corrected. The user may submit a correction to the recommended event evaluation results corresponding to one or more events and these corrections can be used to, for example, retrain/update the one or more machine learning models that were used to detect the signals that were ultimately combined into combined signals that were compared to the event criteria.

Figure 14A:
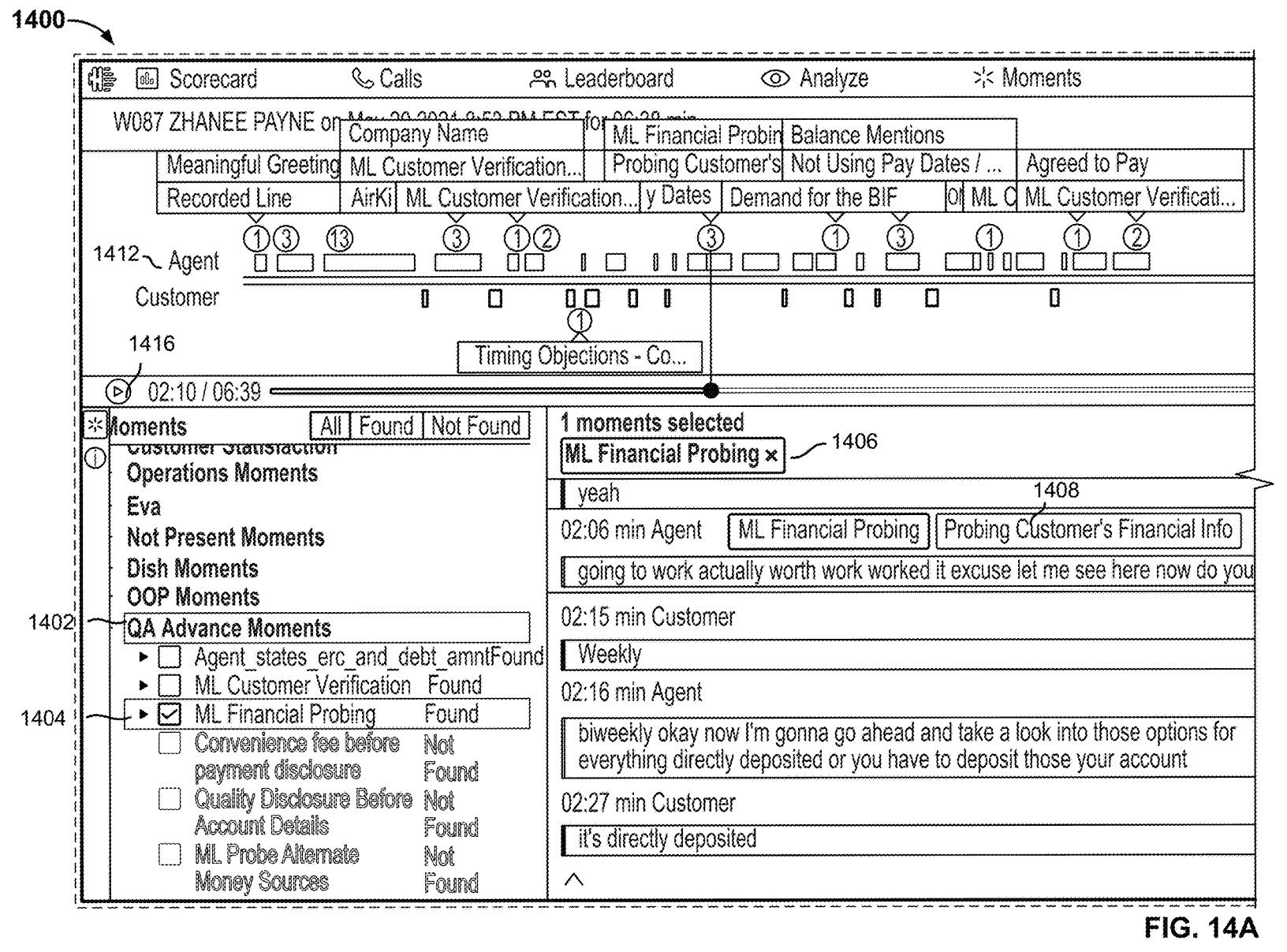
Figure 14B:
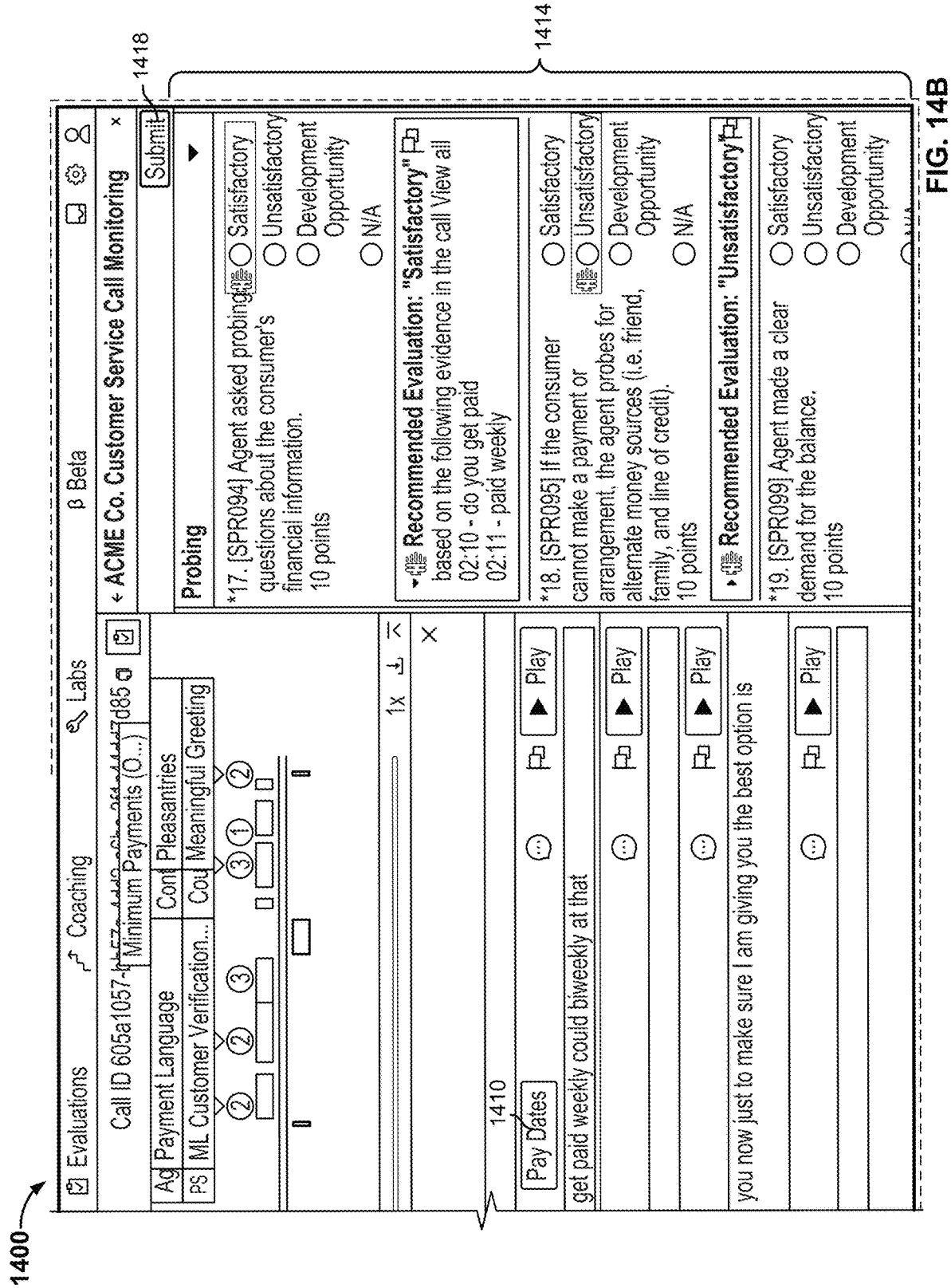

FIGS. 14A and 14B are diagrams showing a single example user interface for presenting combined signals and recommended event evaluation results corresponding to a processed recorded interaction. In some embodiments, the user interface described in step 618 of process 600 of FIG. 6 and the user interface described in step 1306 of process 1300 of FIG. 13 may each be implemented using user interface 1400 as shown across FIGS. 14A and 14B. FIG. 14A shows the lefthand side of example user interface 1400 and FIG. 14B shows the righthand side of the same user interface. In the example of FIGS. 14A and 14B, the recorded interaction comprises a recorded phone call between two participants: a customer service agent ("agent") and a customer. The customer had called the agent associated with the Acme Company ("Acme Co.") to discuss a customer service issue. To view the combined signals (which are referred to as "QA advance moments") that were derived from the recorded phone call, the user had expanded the list under QA Advance Moments 1402 (as shown in FIG. 14A). To view the specific combined signal of ML Financial Probing 1404, the user had selected the corresponding checkbox as shown in FIG. 14A. In user interface 1400, the combined signal of ML Financial Probing 1404 returns a Boolean value, which is shown in user interface 1400 in FIG. 14A as "Found" (meaning that the Boolean value was "true" to represent that the combination of the signals that were grouped together to determine the combined signal of ML Financial Probing 1404 was present in the recorded phone call). To view the snippets of the text streams associated with the agent and the customer, and also the audio segments of the recorded phone call from which signals were combined together to form the combined signal of ML Financial Probing 1404, the user can view the section under 1406 across FIGS. 14A and 14B. Section 1406 shows the snippets of the text streams associated with the agent and the customer and also the audio segments of the recorded phone call that support individual signals that were detected from the recorded phone call and these individual signals were eventually combined together using operators (e.g., that were prescribed in a set of interaction processing configuration information). For example, section 1406 shows the timestamps within the recorded phone call at which audio segments and/or text transcriptions support the individual signals of Probing Customer's Financial Info 1408 (as shown in FIG. 14A) and Pay Dates 1410 (as shown in FIG. 14B). The signals of Probing Customer's Financial Info 1408 (as shown in FIG. 14A) and Pay Dates 1410 (as shown in FIG. 14B) were detected by either applying keyword spotting and/or machine learning to the audio or text stream belonging to the agent or across both the agent and the customer, as described above. In addition to showing the timestamps of the relevant audio segments and the corresponding text transcriptions that support the individual signals of Probing Customer's Financial Info 1408 (as shown in FIG. 14A) and Pay Dates 1410 (as shown in FIG. 14B), section 1406 also provides a Play button (as shown in FIG. 14B) that allows the user to listen to the corresponding audio segment that corresponds to the displayed portion of the text stream. The user can use the displayed text snippets and available audio segments to manually review relevant portions of the recorded interaction to help him or her, if desired, manually evaluate those portions of the interaction. The user can also listen to any portion of the recorded phone call by selecting playback controls 1416 to review different portions of the recorded phone call. Visual 1412 also shows the portions of the recorded call that correspond to speech/ audio associated with each of the agent and the customer.

Recommended event evaluation results corresponding to events are shown in section 1414 of user interface 1400 (as shown in FIG. 14B). As described above, the combined signals that are derived from a recorded interaction can be compared to event criteria associated with one or more events to determine event evaluation results comprising whether such events occurred within the interaction and/or how well such events were performed (e.g., by a participant with a specified role) within the interaction. One event shown in section 1414 is "17. [SPR094] Agent asked probing questions about the consumer's financial information" and it is shown with several possible choices of evaluation results (e.g., "Satisfactory," "Unsatisfactory," "Development Opportunity," "N/A"). The recommended event evaluation result for this event is "Satisfactory," which is the determined result from comparing one or more combined signals derived from the recorded interaction to event criteria. The recommended event evaluation result of "Satisfactory" is also presented with timestamps and text snippets corresponding to portions of the recorded interaction that (e.g., include detected signals that) support the combined signal(s) that lead to the "Satisfactory" determination. Another event shown in section 1414 is "18. [SPR095] If the consumer cannot make a payment or arrangement, the agent probes for alternate money sources (i.e., friend, family, and line of credit)" and it is shown with several possible choices of evaluation results (e.g., "Satisfactory," "Unsatisfactory," "Development Opportunity," "N/A"). The recommended event evaluation result for this event is "Unsatisfactory," which is the determined result from comparing one or more combined signals derived from the recorded interaction to event criteria. Because there are no detected signals that were able to be combined to match the event criteria associated with this event, the recommended event evaluation result of "Unsatisfactory" is not presented with timestamps and text snippets corresponding to portions of the recorded interaction. If after the user manually reviews the interaction action (e.g., by listening to the recorded audio and/or reading the text transcriptions) and determines that some of the recommended event evaluation results are incorrect, the user can select a different choice of an evaluation result in section 1414 of user interface 1400 (as shown in FIG. 14B) and this selected choice can be stored as a correction by the system. As mentioned above, such corrections can be used to retrain/update/modify the machine learning models or other techniques that are used to detect signals from the recorded interaction to improve future signal detection from subsequent interactions to process. After the user reviews all the recommended event evaluation results corresponding to the events shown in section 1414, the user can select Submit button 1418 to cause the confirmed event evaluation results to be submitted/saved for the recorded interaction.

As such, user interface 1400 that is shown across FIGS. 14A and 14B shows programmatically determined recommended event evaluation results corresponding to a recorded interaction that would enable a user to quickly and efficiently review the interaction to evaluate the quality of the performance of at least one participant in the interaction. Instead of needing to consume the entire recorded interaction (e.g., a recorded phone call, a series of text-based messages, and/or a video), the user can just review the recommended event evaluation results at the user interface and/or review the relevant text snippets and/or audio segments (if desired) to complete their review of the entire interaction.

The following describes an experiment that was conducted using various techniques described herein on recorded customer service calls. The example evaluated the customer agent's (associated with XYZ company) performance by using signals that detected varying verbatim for a call opening and a call closing:

Objectives:
  Addresses the first type of questions.
  Designs signals relevant to a call opening related questions.
  Creates a "proper" call opening combined signal (advance moment) by combining signals associated with the agent's call opening.

The following were sample events to be detected in the experiment and the signals that can be used to determine whether these events occurred within the interaction:

Event 1: XYZ Company: Did the Agent Give a Warm Greeting and Mention the Company Name?
  Signals associated with Event 1: warm greeting made by the customer service agent, a mention of XYZ company name by the customer service agent Event 2: Did the Agent Properly Identify the Agency, Creditor, and Amount of Debt?
  Signals associated with Event 2: the presence of the company name within the agent's speech, the presence of the client name within the agent's speech, the presence of numbers representing money within the agent's speech The following signals were actually identified for this experiment from a recorded call:
  Intent type signals
    Warm greeting
    Offer to help
    Self introduction
  Entity question type signals
    company name
    client name
    money related numbers
    email address
    phone number
  Temporal type signals
    part of call (first 60 seconds)

It was found that the combined signals (advance moments) constructed by these signals outperform the conventional technique of (e.g., manually) determining whether individual key phrases are present within the interaction.

These signals also prove to be capable of answering complex questions that were not within reach of conventional techniques. The following is an example of one such complex question: Did the agent give a warm greeting, introduce himself, mention the company name, and offer to help as a part of call opening?

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory; and
a processor coupled to the memory and configured to:
train at least one machine learning model to detect signals, wherein the at least one machine learning model includes a machine learning model that is trained with training data comprising text that is annotated with correct question classifications;
use the at least one machine learning model to detect a plurality of signals associated with an interaction among two or more speaker roles, wherein a signal comprises a text-based signal or an audio-based signal within a respective audio or text stream associated with the two or more speaker roles;
combine two or more signals of the plurality of signals using a prescribed set of operators into a combined signal, wherein the prescribed set of operators are defined by a set of interaction processing configuration information;
determine a recommended event evaluation result based at least in part on whether a criterion associated with an event has been met with respect to the interaction based at least in part on the combined signal;
output, at a user interface:
one or more of audio portions and text portions of the interaction corresponding to the two or more signals that were detected from the interaction and that were combined into the combined signal; and
the recommended event evaluation result corresponding to the event; and
receive a user feedback comprising a correction to the recommended event evaluation result corresponding to the event; and
retrain the at least one machine learning model based at least in part on the correction to improve subsequent signal detection from subsequent interactions.

2. The system of claim 1, wherein the interaction comprises a first audio stream and a second audio stream, wherein each of the first audio stream and the second audio stream corresponds to respective speech by the two or more speaker roles.

3. The system of claim 2, wherein the processor is configured to generate a first text stream from the first audio stream and generate a second text stream from the second audio stream.

4. The system of claim 3, wherein to use the at least one machine learning model to detect the plurality of signals from one or more of the following: the first audio stream, the second audio stream, the first text stream, and the second text stream.

5. The system of claim 3, wherein to use the at least one machine learning model to detect the plurality of signals from one or more of the following: the first audio stream, the second audio stream, the first text stream, and the second text stream, and wherein to detect the plurality of signals in the interaction includes to determine an entity question and a provided answer signal, including to:
identify the entity question in the first text stream associated with a first speaker role;
determine a first set of temporal information associated with the entity question in the first text stream;
use the first set of temporal information to determine a candidate answer within the second text stream associated with a second speaker role, wherein the candidate answer comprises text that is associated with a second set of temporal information, wherein the second set of temporal information is later than the first set of temporal information;
determine that the candidate answer does correspond to the entity question; and
detect that the entity question and a provided answer are present in the interaction.

6. The system of claim 3, wherein to use the at least one machine learning model to detect the plurality of signals from one or more of the following: the first audio stream, the second audio stream, the first text stream, and the second text stream, and wherein to detect the plurality of signals in the interaction includes to determine a sympathetic exchange signal, including to:
identify a predetermined keyword in the first text stream associated with a first speaker role;
determine a first set of temporal information associated with the predetermined keyword in the first text stream;
use the first set of temporal information to determine a sympathetic expression from the first text stream;
use the first set of temporal information to determine a response within the second text stream associated with a second speaker role, wherein the response comprises text that is associated with a second set of temporal information, wherein the second set of temporal information is later than the first set of temporal information;
determine that the sympathetic expression and the response form a sympathetic exchange; and
detect that the sympathetic exchange is present in the interaction.

7. The system of claim 1, wherein the interaction comprises one or more of the following: a recorded phone call, a chat log, a set of emails, and a recorded video.

8. The system of claim 1, wherein the user interface comprises a first user interface, and wherein the processor is further configured to obtain the set of interaction processing configuration information associated with a specified objective including to:
receive, via a second user interface, the specified objective;
present, via the second user interface, groups of signals associated with the specified objective;
receive, via the second user interface, one or more edits to the groups of signals;
receive, via the second user interface, the prescribed set of operators to use to combine a respective group of signals; and
receive, via the second user interface, event criteria comprising mappings between combined signals and recommended event evaluation results.

9. The system of claim 8, wherein to obtain the set of interaction processing configuration information associated with the specified objective further includes to receive a set of weights to use to combine the respective group of signals.

10. The system of claim 1, wherein to detect the plurality of signals in the interaction includes to determine one or more of the following: an articulation signal, a speaking rate signal, an intent signal, a key phrase signal, a dialogue indicating a key phrase plus action signal, a dialogue prompting a negative response signal, and a providing correction information signal.

11. The system of claim 1, wherein the correction to the recommended event evaluation result comprises a selected evaluation result that is different from the recommended event evaluation result.

12. The system of claim 1, wherein the prescribed set of operators comprises one or more of the following: AND, OR, NEAR, DIALOG AND, LEFT, and RIGHT.

13. A method, comprising:
training at least one machine learning model to detect signals, wherein the at least one machine learning model includes a machine learning model that is trained with training data comprising text that is annotated with correct question classifications;
using the at least one machine learning model to detect a plurality of signals associated with an interaction among two or more speaker roles, wherein a signal comprises a text-based signal or an audio-based signal within a respective audio or text stream associated with the two or more speaker roles;
combining, using one or more processors, two or more signals of the plurality of signals using a prescribed set of operators into a combined signal, wherein the prescribed set of operators are defined by a set of interaction processing configuration information;
determining a recommended event evaluation result based at least in part on whether a criterion associated with an event has been met with respect to the interaction based at least in part on the combined signal;
outputting, at a user interface:
one or more of audio portions and text portions of the interaction corresponding to the two or more signals that were detected from the interaction and that were combined into the combined signal; and
the recommended event evaluation result corresponding to the event; and
receiving a user feedback comprising a correction to the recommended event evaluation result corresponding to the event; and
retraining the at least one machine learning model based at least in part on the correction to improve subsequent signal detection from subsequent interactions.

14. The method of claim 13, wherein the interaction comprises a first audio stream and a second audio stream, wherein each of the first audio stream and the second audio stream corresponds to respective speech by the two or more speaker roles.

15. The method of claim 14, further comprising generating a first text stream from the first audio stream and generating a second text stream from the second audio stream.

16. The method of claim 15, wherein using the at least one machine learning model to detect the plurality of signals from one or more of the following: the first audio stream, the second audio stream, the first text stream, and the second text stream.

17. The method of claim 16, wherein to detect the plurality of signals in the interaction includes determining an entity question and a provided answer signal, including:
identifying the entity question in the first text stream associated with a first speaker role;
determining a first set of temporal information associated with the entity question in the first text stream;
using the first set of temporal information to determine a candidate answer within the second text stream associated with a second speaker role, wherein the candidate answer comprises text that is associated with a second set of temporal information, wherein the second set of temporal information is later than the first set of temporal information;
determining that the candidate answer does correspond to the entity question; and
detecting that the entity question and a provided answer are present in the interaction.

18. The method of claim 13, wherein the correction to the recommended event evaluation result comprises a selected evaluation result that is different from the recommended event evaluation result.

19. A computer program product, the computer program product comprising a non-transitory computer readable storage medium and comprising computer instructions for:
training at least one machine learning model to detect signals, wherein the at least one machine learning model includes a machine learning model that is trained with training data comprising text that is annotated with correct question classifications;
using the at least one machine learning model to detect a plurality of signals associated with an interaction among two or more speaker roles, wherein a signal comprises a text-based signal or an audio-based signal within a respective audio or text stream associated with the two or more speaker roles;
combining two or more signals of the plurality of signals using a prescribed set of operators into a combined signal, wherein the prescribed set of operators are defined by a set of interaction processing configuration information;
determining a recommended event evaluation result based at least in part on whether a criterion associated with an event has been met with respect to the interaction based at least in part on the combined signal;
outputting, at a user interface:
one or more of audio portions and text portions of the interaction corresponding to the two or more signals that were detected from the interaction and that were combined into the combined signal; and
the recommended event evaluation result corresponding to an event; and
receiving a user feedback comprising a correction to the recommended event evaluation result corresponding to the event; and
retraining the at least one machine learning model based at least in part on the correction to improve subsequent signal detection from subsequent interactions.

* * * * *